(12) United States Patent
Wang et al.

(10) Patent No.: US 11,589,078 B2
(45) Date of Patent: *Feb. 21, 2023

(54) METHOD AND APPARATUS FOR THREE-DIMENSIONAL (3D)-TREE CODING FOR NEURAL NETWORK MODEL COMPRESSION

(71) Applicant: TENCENT AMERICA LLC, Palo Alto, CA (US)

(72) Inventors: Wei Wang, Palo Alto, CA (US); Wei Jiang, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,455

(22) Filed: Nov. 29, 2021

(65) Prior Publication Data

US 2022/0086506 A1    Mar. 17, 2022

Related U.S. Application Data

(63) Continuation of application No. 17/081,158, filed on Oct. 27, 2020, now Pat. No. 11,234,024.

(Continued)

(51) Int. Cl.
*H04N 19/96* (2014.01)
*G06N 3/08* (2006.01)
(Continued)

(52) U.S. Cl.
CPC .............. *H04N 19/96* (2014.11); *G06N 3/08* (2013.01); *H04N 19/119* (2014.11); *H04N 19/13* (2014.11); *H04N 19/91* (2014.11)

(58) Field of Classification Search
CPC ...... H04N 19/96; H04N 19/119; H04N 19/13; H04N 19/91; H04N 19/70; G06N 3/08; G06N 3/0454; G06N 3/082
(Continued)

(56) References Cited

U.S. PATENT DOCUMENTS

2016/0100171 A1    4/2016   Karczewicz
2016/0217369 A1    7/2016   Annapureddy et al.
(Continued)

FOREIGN PATENT DOCUMENTS

| CN | 110097178 A | 8/2019 |
| WO | 2018/200316 A2 | 11/2018 |
| WO | 2020190772 A1 | 9/2020 |

OTHER PUBLICATIONS

Andros Tjandra et al., "Compressing Recurrent Neural Network with Tensor Train", Graduate School of Information Science, Nara Institute of Science and Technology, 2017, pp. 1-8 (8 pages).
(Continued)

*Primary Examiner* — Matthew K Kwan
(74) *Attorney, Agent, or Firm* — Sughrue Mion, PLLC

(57) ABSTRACT

A method of three-dimensional (3D)-Tree coding for neural network model compression, is performed by at least one processor, and includes reshaping a four-dimensional (4D) parameter tensor of a neural network into a 3D parameter tensor of the neural network, the 3D parameter tensor comprising a convolution kernel size, an input feature size, and an output feature size, partitioning the 3D parameter tensor along a plane that is formed by the input feature size and the output feature size into 3D coding tree units (CTU3Ds), partitioning each of the CTU3Ds into a plurality of 3D coding units (CU3Ds) recursively until a predetermined depth, using a quad-tree, and constructing a 3D tree (Continued)

GEPM/GEBP partition

GEPP/GEBP partition for each of the plurality of CU3Ds, wherein the 3D tree for each of the plurality of CU3Ds is a 3D-Unitree.

20 Claims, 8 Drawing Sheets

Related U.S. Application Data

(60) Provisional application No. 62/994,660, filed on Mar. 25, 2020, provisional application No. 62/975,485, filed on Feb. 12, 2020, provisional application No. 62/957,691, filed on Jan. 6, 2020, provisional application No. 62/957,699, filed on Jan. 6, 2020, provisional application No. 62/940,427, filed on Nov. 26, 2019, provisional application No. 62/939,054, filed on Nov. 22, 2019.

(51) Int. Cl.
  *H04N 19/119* (2014.01)
  *H04N 19/13* (2014.01)
  *H04N 19/91* (2014.01)

(58) Field of Classification Search
  USPC .................................................. 375/240.02
  See application file for complete search history.

(56) References Cited

U.S. PATENT DOCUMENTS

| | | |
|---|---|---|
| 2017/0076196 A1 | 3/2017 | Sainath et al. |
| 2019/0340499 A1 | 11/2019 | Burger |
| 2020/0311551 A1 | 10/2020 | Aytekin et al. |

OTHER PUBLICATIONS

International Search Report dated Feb. 9, 2021 in International Application No. PCT/US20/61255.
Written Opinion of the International Searching Authority dated Feb. 9, 2021 in International Application No. PCT/US20/61255.
Simon Wiedemann et al., "DeepCABAC: A Universal Compression Algorithm for Deep Neural Networks", Fraunhofer Heinrich Hertz Institute, 2019, pp. 1-18 (18 pages).
Video Subgroup, "Test model 2 of Compression of neural networks for multimedia content description and analysis", ISO/IEC JTC1/SC29/WG11/N18785, Oct. 2019, pp. 1-10, Geneva, CH.
Video Subgroup, "Working Draft 2 of Compression of neural networks for multimedia content description and analysis", ISO/IEC JTC1/SC29/WG11/N18784, Oct. 2019, pp. 1-26, Geneva, CH.
Video Subgroup, "Description of Core Experiments on Compression of neural networks for multimedia content description and analysis", ISO/IEC JTC1/SC29/WG11/N18782, Oct. 2019, pp. 1-14, Geneva, CH.
Extended European Search Report dated Mar. 28, 2022 in European Application No. 20889750.4.
Wei Wang et al., "Huawei Response to Call for Proposals for Compressed Representation of Neural Networks (NNR)", ISO/IEC JTC1/SC29/WG11 MPEG2019/M47491, 2019 (24 pages total).

METHOD AND APPARATUS FOR THREE-DIMENSIONAL (3D)-TREE CODING FOR NEURAL NETWORK MODEL COMPRESSION

CROSS-REFERENCE TO RELATED APPLICATION

This application is a continuation of U.S. application Ser. No. 17/081,158, filed on Oct. 27, 2020, which claims priority from U.S. Provisional Patent Application No. 62/939,054, filed on Nov. 22, 2019, U.S. Provisional Patent Application No. 62/940,427, filed on Nov. 26, 2019, U.S. Provisional Patent Application No. 62/957,699, filed on Jan. 6, 2020, U.S. Provisional Patent Application No. 62/957,691, filed on Jan. 6, 2020, U.S. Provisional Patent Application No. 62/975,485, filed on Feb. 12, 2020, and U.S. Provisional Patent Application No. 62/994,660, filed on Mar. 25, 2020, in the U.S. Patent and Trademark Office, the disclosures of which are incorporated herein by reference in their entireties.

BACKGROUND

Success of Deep Neural Networks (DNNs) in a large range of video applications such as semantic classification, target detection/recognition, target tracking, video quality enhancement, etc. poses a need for compressing DNN models. Therefore, the Motion Picture Experts Group (MPEG) is actively working on the Coded Representation of Neural Network standard (NNR) that is used to encode DNN models to save both storage and computation.

SUMMARY

According to embodiments, a method of three-dimensional (3D)-Tree coding for neural network model compression, is performed by at least one processor, and includes reshaping a four-dimensional (4D) parameter tensor of a neural network into a 3D parameter tensor of the neural network, the 3D parameter tensor comprising a convolution kernel size, an input feature size, and an output feature size, partitioning the 3D parameter tensor along a plane that is formed by the input feature size and the output feature size into 3D coding tree units (CTU3Ds), partitioning each of the CTU3Ds into a plurality of 3D coding units (CU3Ds) recursively until a predetermined depth, using a quad-tree, constructing a 3D tree for each of the plurality of CU3Ds, and entropy encoding each of a plurality of values of a plurality of nodes of the 3D tree.

According to embodiments, an apparatus for adaptive block partitioning for neural network model compression, includes at least one memory configured to store program code, and at least one processor configured to read the program code and operate as instructed by the program code. The program code includes reshaping code configured to cause the at least one processor to reshape a four-dimensional (4D) parameter tensor of a neural network into a 3D parameter tensor of the neural network, the 3D parameter tensor comprising a convolution kernel size, an input feature size, and an output feature size, first partitioning code configured to cause the at least one processor to partition the 3D parameter tensor along a plane that is formed by the input feature size and the output feature size, into 3D coding tree units (CTU3Ds), second partitioning code configured to cause the at least one processor to partition each of the CTU3Ds into a plurality of 3D coding units (CU3Ds) recursively until a maximum depth, using a quad-tree, first constructing code configured to cause the at least one processor to construct a 3D-Tree for each of the plurality of CU3Ds, and first entropy encoding code configured to cause the at least one processor to entropy encode each of a plurality of values of a plurality of nodes of the 3D tree.

According to embodiments, a non-transitory computer-readable medium stores instructions that, when executed by at least one processor for adaptive block partitioning for neural network model compression, cause the at least one processor to reshape a four-dimensional (4D) parameter tensor of a neural network into a 3D parameter tensor of the neural network, the 3D parameter tensor comprising a convolution kernel size, an input feature size, and an output feature size, partition the 3D parameter tensor along a plane that is formed by the input feature size and the output feature size, into 3D coding tree units (CTU3Ds), partition each of the CTU3Ds into a plurality of 3D coding units (CU3Ds) recursively until a maximum depth, using a quad-tree, construct a 3D-Tree for each of the plurality of CU3Ds, and entropy encode each of a plurality of values of a plurality of nodes of the 3D tree.

DETAILED DESCRIPTION

Figure 1:
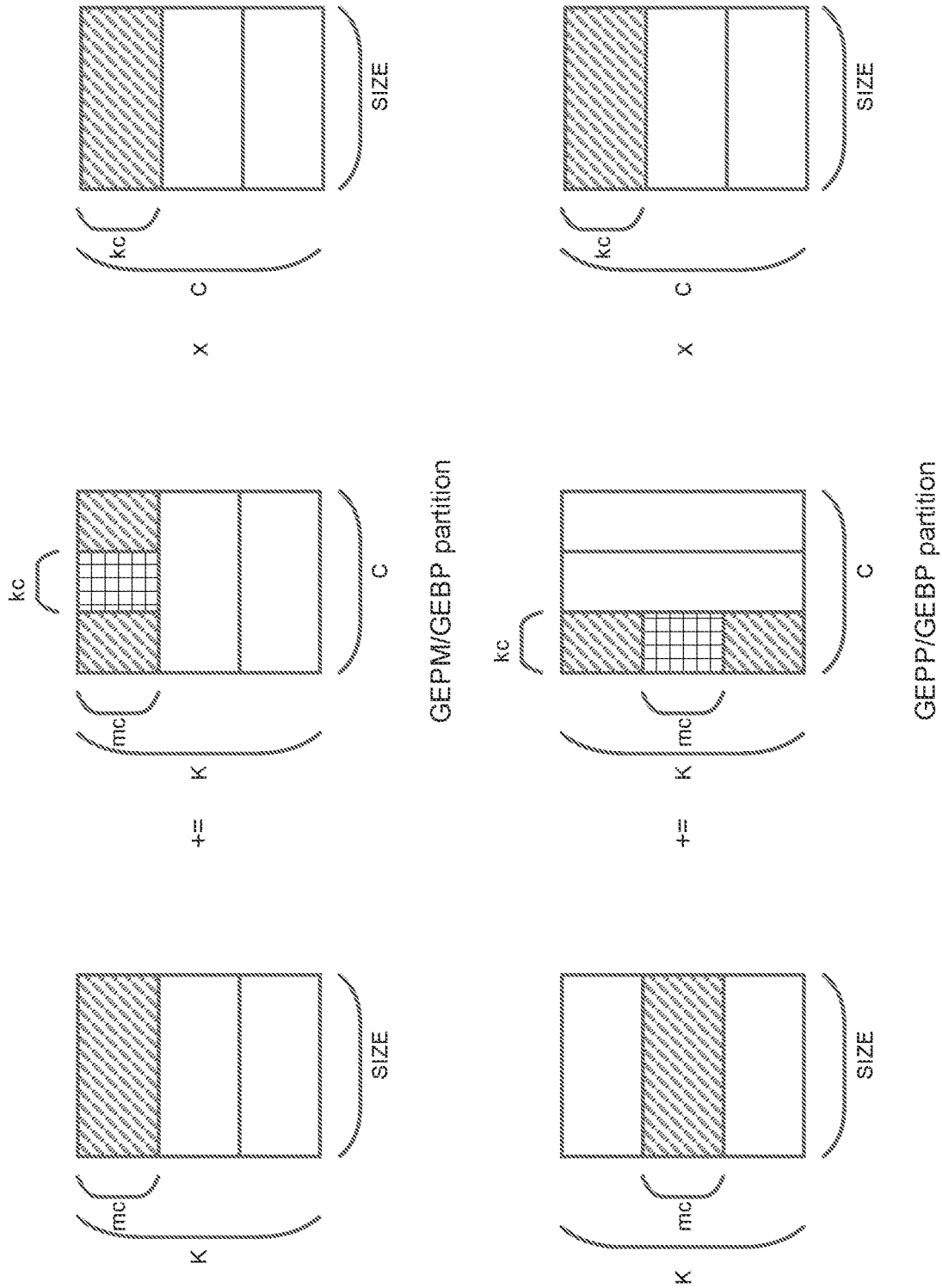
FIG. 1 is a diagram of a GEPM/GEPP partition method.

This disclosure is related to neural network model compression. To be more specific, methods and apparatuses described herein are related to 3D-Tree coding for neural network model compression.

Scan Order

In the compression of neural networks for multimedia content description and analysis, if a dimension of a weight tensor is more than two (such as a convolution layer), this weight tensor is reshaped to a two-dimensional (2D) tensor. No reshape is performed if the dimension of weight tensor is no more than two (such as a fully connected layer or a bias layer).

The encoding method scans weight coefficients in a row-first manner from left to right and scans rows from top to bottom.

TABLE 1

```
quant_weight_tensor( dimensions, maxNumNoRem ) {
    dim = Size( dimensions )
    for( i = TensorIterator( dim );!TensorIteratorEnd( i, dimensions ); i =
TensorIteratorNext( i, dimensions ) {
        quant_weight( i, maxNumNoRem )
    }
}
```

Quantization

In the compression of neural networks for multimedia content description and analysis, nearest neighbour quantization is applied in a uniform way to each weight coefficient in weight matrices. A fixed step size is applied. Reconstructed values in a decoded matrix are integer multiples of the step size. The step size is defined as a 32-bit floating number.

TABLE 2

```
step_size( ) {
    step_size                   flt(32)
}
``` step_size is the quantization step size.

Entropy Coding

In the compression of neural networks for multimedia content description and analysis, each quantized weight level is encoded according to the following procedure employing an integer parameter maxNumNoRem:

In a first step, a binary syntax element sig_flag is encoded for the quantized weight level, which specifies whether a corresponding level is equal to zero. If the sig_flag is equal to one, a further binary syntax element sign_flag is encoded. A bin indicates if a current weight level is positive or negative. Next, a unary sequence of bins is encoded, followed by a fixed length sequence as follows:

A variable k is initialized with zero and X is initialized with 1<<k. A syntax element abs_level_greater_X is encoded, which indicates that an absolute value of the quantized weight level is greater than X. If abs_level_greater_X is equal to 1 and if X is greater than maxNumNoRem, the variable k is increased by 1. Afterwards, 1<<k is added to X and a further abs_level_greater_X is encoded. This procedure is continued until an abs_level_greater_X is equal to 0. Now, X must be one of values (X, X−1, . . . X−(1<<k)+1). A code of length k is encoded, which points to values in a list that is an absolute quantized weight level.

Context modeling corresponds to associating three type of flags sig_flag, sign_flag, and abs_level_greater_X with context models. In this way, flags with similar statistical behavior may be associated with the same context model so that a probability estimator (inside of the context model) can adapt to underlying statistics.

The context modeling of the presented approach is as follows:

Three context models are distinguished for the sig_flag, depending on whether a neighboring quantized weight level to the left is zero, smaller than zero, or larger than zero.

Three other context models are distinguished for the sign_flag depending on whether the neighboring quantized weight level to the left is zero, smaller than zero, or larger than zero.

For the abs_level_greater_X flags, each X uses, either one or two separate context models. If X<=maxNumNoRem, two context models are distinguished depending on the sign_flag. If X>maxNumNoRem, only one context model is used.

TABLE 3

```
quant_weight( i, maxNumNoRem ) {
    QuantWeight[i] = 0
    sig_flag                                                    ae(v)
    if( sig_flag ) {
        QuantWeight[i]++
        sign_flag                                               ae(v)
        j = −1
        do {
            j++
            abs_level_greater_x[j]                              ae(v)
            QuantWeight[i] +=
            abs_level_greater_x[j]
        } while( abs_level_greater_x[j] == 1 &&
        j < maxNumNoRem )
        if( j == maxNumNoRem ) {
            RemBits = 0
            j = −1
            do {
                j++
                abs_level_greater_x2[j]                         ae(v)
                if( abs_level_greater_x2[j] ) {
                    RemBits++
                    QuantWeight[i] += 1 <<
                    RemBits
                }
            } while( abs_level_greater_x2[j] )
            abs_remainder                                       uab(RemBits)
            QuantWeight[i] += abs_remainder
        }
        QuantWeight[i] = sign_flag ? −QuantWeight[i]
                        : QuantWeight[i]
    }
}
``` sig_flag specifies whether a quantized weight QuantWeight[i] is nonzero. A sig_flag equal to 0 indicates that QuantWeight[i] is zero.
sign_flag specifies whether the quantized weight QuantWeight[i] is positive or negative. A sign_flag equal to 1 indicates that QuantWeight[i] is negative.
abs_level_greater_x[j] indicates whether an absolute level of QuantWeight[i] is greater j + 1.
abs_level_greater_x2[j] includes an unary part of an exponential golomb remainder.
abs_remainder indicates a fixed length remainder.

Inference operation for deep learning system uses matrix multiplication intensively so a high-performance matrix multiplication library (GEMM) is the key for inference operation. Depending on a size of a left-hand-side (lhs) matrix and a right-hand-side (rhs) matrix, two GEMM routines (GEPP/GEBP, GEPM/GEBP) are recognized by the industry over the last decade as the optimal GEMM solution. As shown in FIG. 1, both methods partition the lhs matrix and the rhs matrix recursively to make the best use of different characteristics of off-chip memory (such as Double Data Rate (DDR)) and on-chip memory (such as multi-level cache) in modern computing platform, and the lhs matrix is usually stored in a column-major order to achieve the optimal memory access pattern. The lhs matrix is usually transposed to achieve the optimal memory access pattern. Some newer GEMM routines (such as QNNPACK) are optimized for neural networks designed for mobile and edge devices, are a variation of either a GEPP routine or a GEPM routine, and follow a similar matrix blocking/partitioning method.

A matrix scan order in the NNR is defined as a row-first manner from left to right and rows from top to bottom. This scan order does not match with a scan order required by the inference operation, as the inference operation must buffer an excessive size of weight coefficients before starts the operation. For example, when the inference operation is performed for a first fully-connect layer of VGG16, given that a matrix size of this layer is 25088×4096, a buffer that can store N×25088 coefficients has to be reserved to perform a GEMM routine. If N=64 for a normal GEMM operation, a buffer size will be 1.5 MB even if coefficients are represented by an 8-bit integer instead of a 32-bit floating number, but such a buffer size is too high especially for mobile and edge devices.

Further, entropy coding in the NNR is performed on a quantized weight coefficient directly. The NNR did not consider a local distribution after a weight tensor is partitioned to non-overlapping 2D/3D coding tree units (CTUs)/3D coding tree units (CTU3Ds). Most weight coefficients are zeros after a sparse/prune operation.

Figure 2:
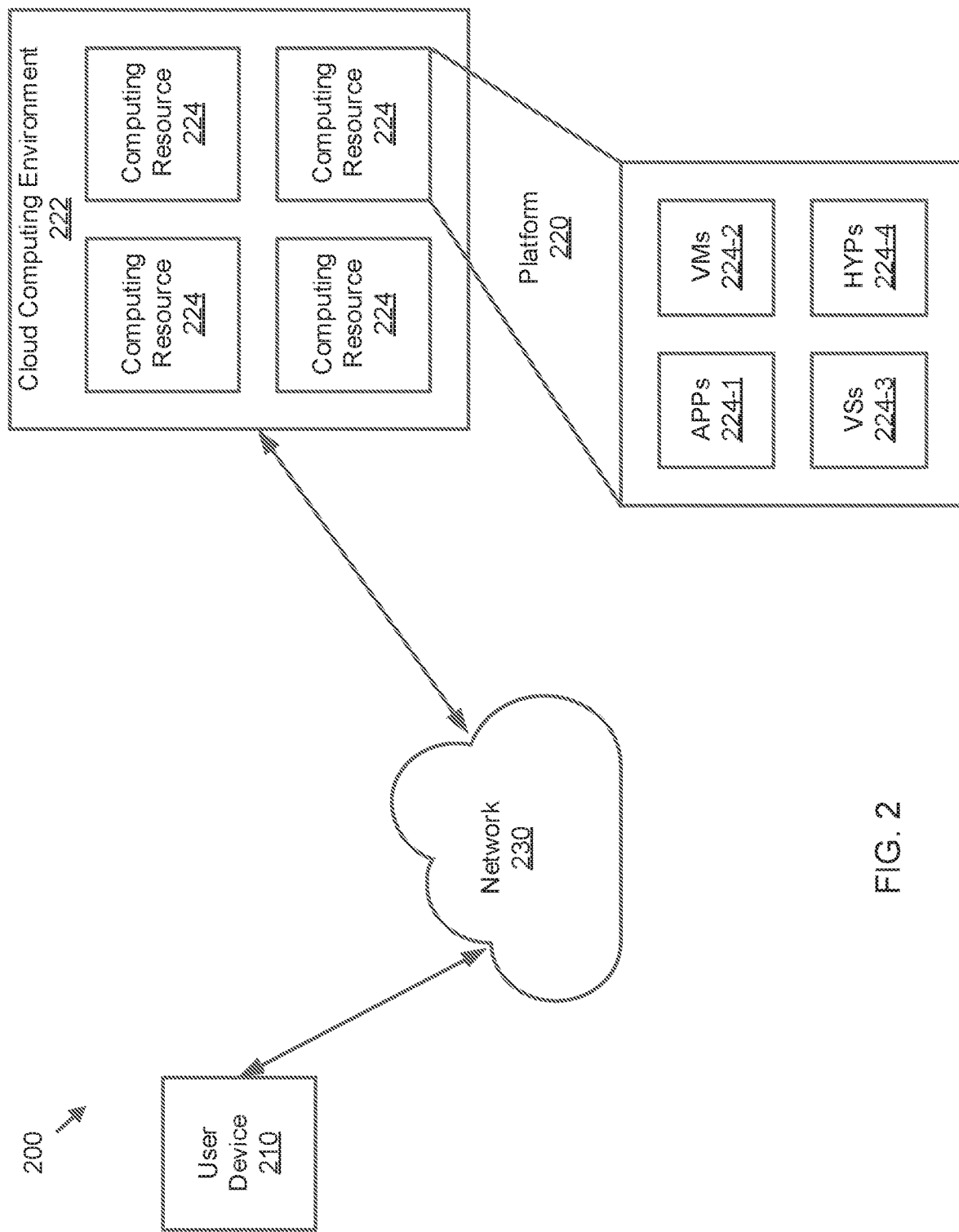
FIG. 2 is a diagram of an environment in which methods, apparatuses and systems described herein may be implemented, according to embodiments.

FIG. 2 is a diagram of an environment 200 in which methods, apparatuses and systems described herein may be implemented, according to embodiments. As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, the platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
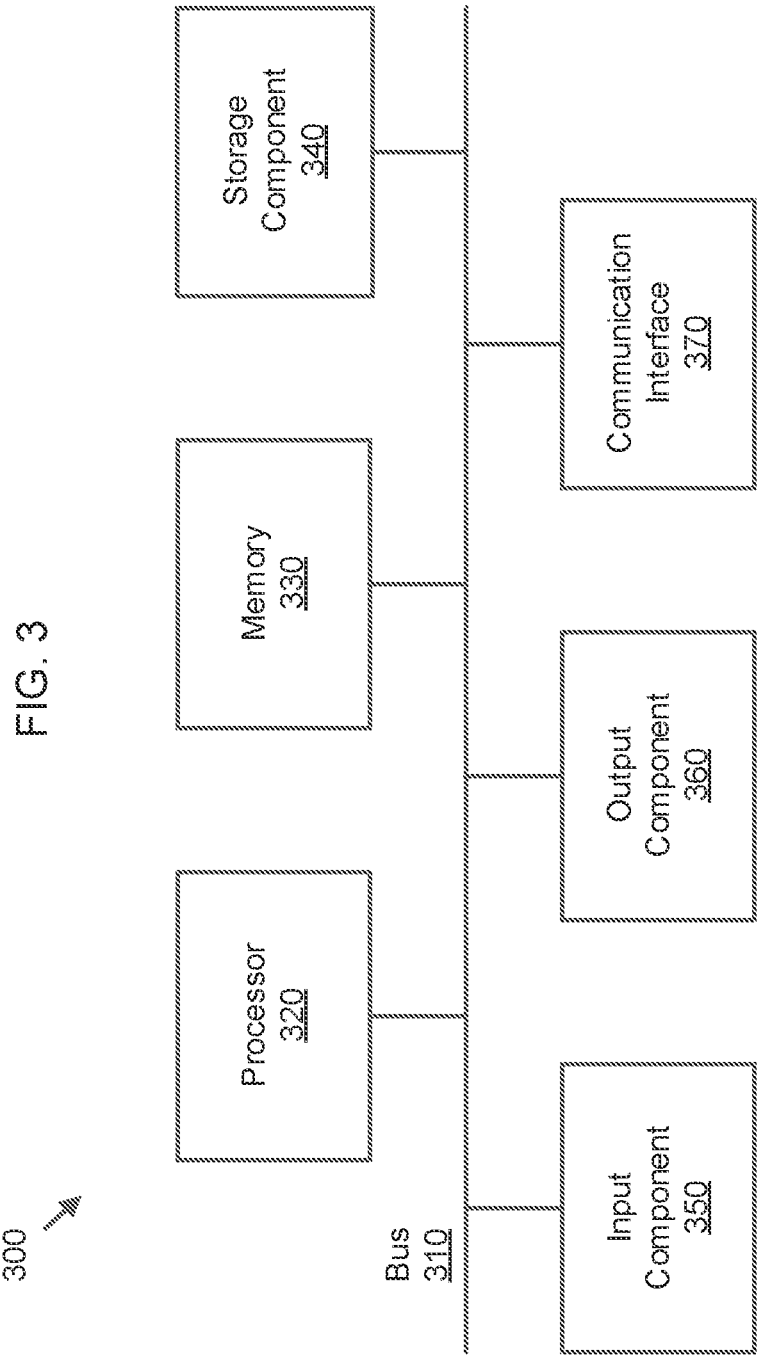
FIG. 3 is a block diagram of example components of one or more devices of FIG. 2.

FIG. 3 is a block diagram of example components of one or more devices of FIG. 2. The device 300 may correspond to the user device 210 and/or the platform 220. As shown in FIG. 3, device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, firmware, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
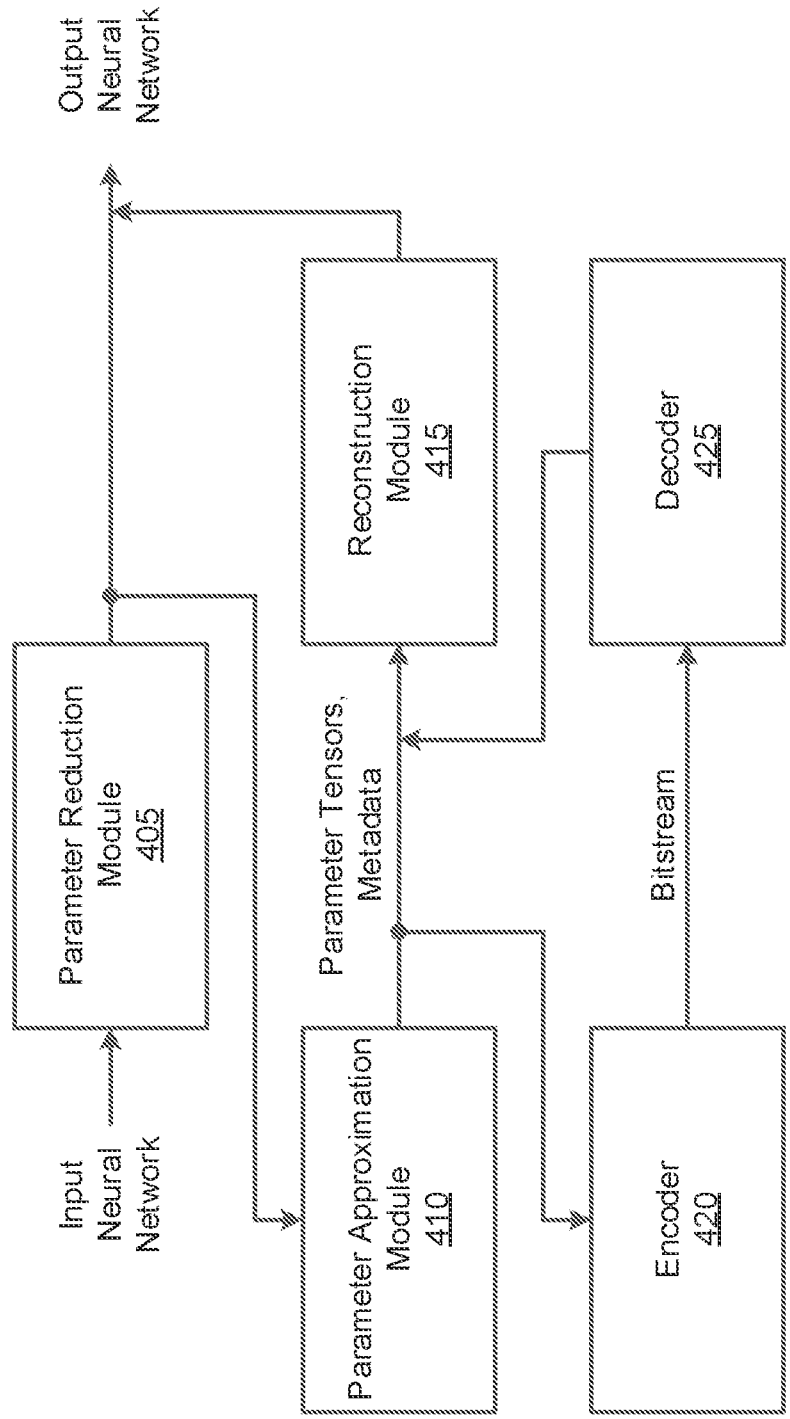
FIG. 4 is a functional block diagram of a system for neural network model compression, according to embodiments.

FIG. 4 is a functional block diagram of a system 400 for neural network model compression, according to embodiments.

As shown in FIG. 4, the system 400 includes a parameter reduction module 405, a parameter approximation module 410, a reconstruction module 415, an encoder 420, and a decoder 425.

The parameter reduction module 405 reduces a set of parameters of an input neural network, to obtain an output neural network. The neural network may include the parameters and an architecture as specified by a deep learning framework.

For example, the parameter reduction module 405 may sparsify (set weights to zero) and/or prune away connections of the neural network. In another example, the parameter reduction module 405 may perform matrix decomposition on parameter tensors of the neural network into a set of smaller parameter tensors. The parameter reduction module 405 may perform these methods in cascade, for example, may first sparsify the weights and then decompose a resulting matrix.

The parameter approximation module 410 applies parameter approximation techniques on parameter tensors that are extracted from the output neural network that is obtained from the parameter reduction module 405. For example, the techniques may include any one or any combination of quantization, transformation and prediction. The parameter approximation module 410 outputs first parameter tensors that are not modified by the parameter approximation module 410, second parameter tensors that are modified or approximated by the parameter approximation module 410, and respective metadata to be used to reconstruct original parameter tensors that are not modified by the parameter approximation module 410, from the modified second parameter tensors.

The reconstruction module 415 reconstructs the original parameter tensors from the modified second parameter tensors that are obtained from the parameter approximation module 410 and/or the decoder 425, using the respective metadata that is obtained from the parameter approximation module 410 and/or the decoder 425. The reconstruction module 415 may reconstruct the output neural network, using the reconstructed original parameter tensors and the first parameter tensors.

The encoder 420 may perform entropy encoding on the first parameter tensors, the second parameter tensors and the respective metadata that are obtained from the parameter approximation module 410. This information may be encoded into a bitstream to the decoder 425.

The decoder 425 may decode the bitstream that is obtained from the encoder 420, to obtain the first parameter tensors, the second parameter tensors and the respective metadata.

The system 400 may be implemented in the platform 220, and one or more modules of FIG. 4 may be performed by a device or a group of devices separate from or including the platform 220, such as the user device 210.

Methods and apparatuses for 3D-Tree coding for neural network model compression will now be described in detail.

CTU3D Partition

If an lhs tensor is stored in a column-major order, or after a transpose of a row-major tensor, a dimension of a weight tensor is usually 4 for a convolution layer with a layout of [R][S][C][K], 2 for a fully-connected layer with a layout of [C][K], and 1 for a bias and batch normal layer. R/S is a convolution kernel size, C is an input feature size and K is an output feature size.

In embodiments, for the convolution layer, a 2D [R][S] dimension is reshaped to an 1D [RS] dimension so that the four-dimensional (4D) tensor [R][S][C][K] is reshaped to a 3D tensor [RS][C][K]. The fully-connected layer is treated as a special case of the 3D tensor with R=S=1.

As the kernel size RS is usually much smaller than C/K, the 3D tensor [RS][C][K] is partitioned along a [C][K] plane with non-overlapping smaller blocks (CTU3D). Each CTU3D has a shape of [RS][ctu3d_height][ctu3d_width], where ctu3d_height=max_ctu3d_height, ctu3d_width= max_ctu3d_width, and max_ctu3d_height/max_ctu3d_ width is encoded in a model header. For a CTU3D that is located at the right and/or bottom of the tensor, its ctu3d_height is a remainder of C/max_ctu3d_height, and its ctu3d_width is a remainder of K/max_ctu3d_width.

Figure 5:
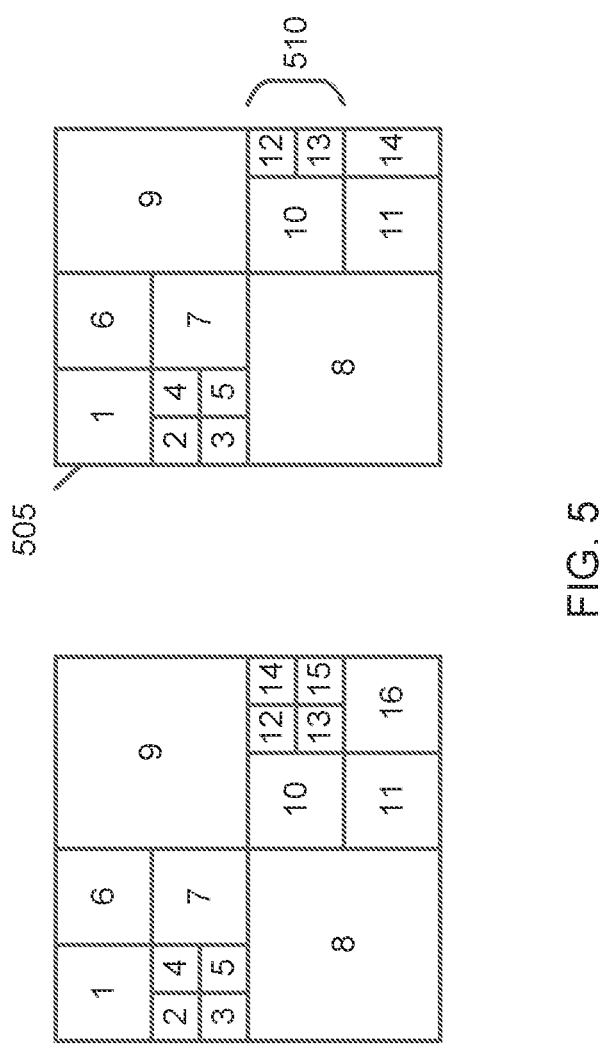
FIG. 5 is a diagram of two examples of an adaptive CTU3D/3D coding unit (CU3D) partition using a raster scan at a vertical direction, according to embodiments.

As shown in FIG. 5, for a CTU3D 505, at the right and/or bottom of a tensor, a parent CU3D node 510 at a given depth may not have all 4 child nodes. For the CU3D 510 that is located at the right and/or bottom of a tensor, cu3d_height is a remainder of max_ctu3d_height/max_cu3d_height, and cu3d_width is a remainder of max_ctu3d_width/ max_cu3d_width.

In further embodiments, a square shape partition is used so that max_ctu3d_height=max_ctu3d_width, and a variable max_ctu3d_size is used to represent both max_ctu3d_height and max_ctu3d_width. max_ctu3d_size is defined as 2**N, and a value of N is 8, 16, 32, 64.

To facilitate an on-chip memory requirement in an inference operation, in embodiments, a flag is defined to indicate whether there is limit for a total CTU3D size for layers with different kernel sizes. The flag that equals to 0 indicates that ctu3d_height/ctu3d_width is kept unchanged regardless of the kernel size, and in this case, a size of a CTU3D for the convolution layer is RS times bigger than a size of a CTU3D for the fully-connected layer. The flag that equals to 1 indicates that ctu3d_height/ctu3d_width is scaled based on the kernel size. For example, ctu3d_height=ctu3d_width=int (ctu3d_height*ctu3d_width/R/S).

While any scan order can be used to scan and process CTU3Ds in a 3D tensor, in embodiments, they are scanned and processed using a raster scan order at either a horizontal direction (SCAN_CK) or a vertical direction (SCAN_KC).

An example of corresponding syntax tables is listed below in Tables 4-6:

TABLE 4

```
nnr( ) {
    ......
    layer_header( )
    if(enable_max_ctu3d_size){
        max_ctu3d_height= max_ctu3d_width=int(              embodiment
        max_ctu3d_size*max_ctu3d_size/R/S), or              1
        max_ctu3d_height= max_ctu3d_width=(2**(bitdepth(int(  embodiment
        max_ctu3d_size * max_ctu3d_size /R/S))−1)            2
    }
    if(layer_scan_order==SCAN_CK){
        for(c=0;c<C;c+=max_ctu3d_height){
            for(k=0;k<K;k+=max_ctu3d_width){
                ctu3d_height=min(max_ctu3d_height,C-c);
                ctu3d_width=min(max_ctu3d_width,K-k);
                last_ctu3d_flag=(max_ctu3d_height>=C-c &&
                max_ctu3d_width>=K-k)?1:0
                ctu3d(c,k,ctu3d_height,ctu3d_width)
                end_of_layer(last_ctu3d_flag)
            }
        }
    }else if(layer_scan_order==SCAN_KC){
        for(k=0;k<K;k+=max_ctu3d_width){
            for(c=0;c<C;c+=max_ctu3d_height){
                ctu3d_height=min(max_ctu3d_height,C-c);
                ctu3d_width=min(max_ctu3d_width,K-k);
```

TABLE 4-continued

```
                last_ctu3d_flag=(max_ctu3d_height>=C-c &&
                max_ctu3d_width>=K-k)?1:0
                ctu3d(c,k,ctu3d_height,ctu3d_width)
                end_of_layer(last_ctu3d_flag)
            }
        }
    }
    ......
}
```

TABLE 5

```
nnr_header( ) {
    ......
    enable_max_ctu3d_size
    max_ctu3d_idx
    ......
}
``` enable_max_ctu3d_size being 0 indicates that ctu3d_height/ctu3d_width is kept unchanged regardless of the kernel size, and enable max ctu3d_size being 1 indicates that ctu3d_height/ctu3d_width is scaled based on the kernel size.

max_ctu3d_idx is in the following equation:

$$\text{max\_ctu\_3d\_size} = (\text{max\_ctu3d\_idx} == 0)?64: \quad (1)$$
$$(\text{max\_ctu3d\_idx} == 1)?32:(\text{max\_ctu3d\_idx} == 2)?16:8$$

TABLE 6

```
layer_header( ) {
    ......
    layer_scan_order
    ......
}
``` layer_scan_order being 0 indicates the raster scan order at a horizontal direction, and layer_scan_order being 1 indicates the raster scan order at a vertical direction.

Adaptive CU3D Partition

In embodiments, a CTU/CU adaptive partitioning method that is used in video coding standards is used.

A simplified blocking structure is used, where a CTU3D/CU3D is partitioned to smaller CU3Ds recursively using a quad-tree structure until a maximum recursive depth is reached. Starting from a CTU3D node, this quad-tree of a CU3D is scanned and processed using a depth-first quad-tree scan order. Child nodes under the same parent node are scanned and processed using a raster scan order at either a horizontal direction or a vertical direction.

For a CU3D at a given quad-tree depth, a max_cu3d_height/max_cu3d_width of these CU3Ds is calculated using Equations (2) and (3) below, and a maximum recursive depth is reached when both max_cu3d_height and max_cu3d_width is smaller than or equal to a predefined threshold. This threshold can either be included in a bitstream explicitly, or can be a predefined number (such as 8) so it can be inferred by a decoder implicitly.

$$\text{max\_cu3d\_height} = \text{max\_ctu3d\_height} >> \text{depth} \quad (2)$$

$$\text{max\_cu3d\_width} = \text{max\_ctu3d\_width} >> \text{depth} \quad (3)$$

In further embodiments, a square shape partition is used so that max_ctu3d_height=max_ctu3d_width. For a CU3D at a given quad-tree depth, a max_cu3d_size of these CU3Ds is calculated using Equation (4) below, and a maximum recursive depth is reached when max_cu3d_size is smaller than or equal to a predefined threshold. This threshold can either be included in a bitstream explicitly, or can be a predefined number (such as 8) so it can be inferred by a decoder implicitly.

$$\text{max\_cu3d\_size} = \text{max\_ctu3d\_size} >> \text{depth} \quad (4)$$

As shown in FIG. 5, for a CTU3D 505, at the right and/or bottom of a tensor, a parent CU3D node 510 at a given depth may not have all 4 child nodes. For the CU3D 510 that is located at the right and/or bottom of a tensor, cu3d_height is a remainder of max_ctu3d_height/max_cu3d_height, and cu3d_width is a remainder of max_ctu3d_width/max_cu3d_width.

In further embodiments, a Rate-Distortion (RD) based encoding algorithm is used to decide whether a parent CU3D is split to multiple smaller child CU3Ds. The parent CU3D is split to the multiple smaller child CU3Ds if a combined RD of these smaller child CU3Ds is smaller than a RD from the parent CU3D. Otherwise, the parent CU3D is not split. A split flag is defined to record this splitting decision.

An example of a corresponding syntax table is listed below in Tables 7 and 8:

TABLE 7

```
ctu3d(...) {
    ......
    cu3d(0,0,0)
    ......
}
```

TABLE 8

```
cu3d(depth,y_idx,x_idx){
    ......
    if(cu3d does not exist)
        return
    if(depth<ctu3d_depth-1){
        split_flag
        if(split_flag){
            cu3d(depth+1,(y_idx<<1),(x_idx<<1))
            cu3d(depth+1,(y_idx<<1)+1,(x_idx<<1))
            cu3d(depth+1,(y_idx<<1),(x_idx<<1)+1)
```

TABLE 8-continued

```
                cu3d(depth+1,(y_idx<<1)+1,(x_idx<<1)+1)
                return
            }
        }
        ......
    }
``` split_flag is a flag to indicate if a parent CU3D is split to 4 smaller child CU3Ds.

Kernel Plane Reorder

As discussed above, a simplified blocking structure is used, in which a CTU3D/CU3D is partitioned to a smaller CU3D recursively, using a quad-tree structure until a maximum recursive depth is reached.

In further embodiments, to facilitate a better compression operation, an RS number of 2D planes within a CU3D or CTU3D can be reordered along an [RS] axis. Reorder indices are encoded in a CU3D header so that each CU3D has its own reorder index, or encoded in a CTU3D header so that all CU3D in this CTU3D share the same reorder indices. A flag is defined to indicate if a reorder operation is allowed. This flag is encoded in either a model header or a layer header.

A zdep_array[RS] is defined to store a reordered index of an RS number of 2D planes. zdep_array[n] indicates that an index n of a reordered 2D plane is from the index zdep_array[n] of an original 2D plane. Because a first 2D plane does not need to be reordered to another location, zdep_arrya[0] is always 0.

Because a reorder operation is always performed in a closed form, a zdep_array can be scanned starting from next_idx=first_idx, and next_idx=zdep_array[next_idx] is iteratively assigned. A loop will be found in which zdep_array[next_idx]=first_idx. If not all indices of zdep_array are included in this loop, the zdep_array can be continuously scanned starting from a first index that is not included in all previous loops, and next_idx=zdep_array[next_idx] is iteratively assigned.

A queue is defined to store a sequence of next_idx, using the aforementioned zdep_array scanning method. A pseudo code for queue generation is listed below:

```
if (zdep_arry[++idx] != -1) {
    first_idx = idx;
    while (zdep_arry[idx] != first_idx) {
        next_idx = zdep_arry[idx];
        queue.push_back(next_idx);
            zdep_arry[idx] = -1;
        idx = next_idx;
    }
    queue.push_back(-1);
    zdep_arry[idx] = -1;
    idx = first_idx;
}
```

Based on the reordering method, content of first and last locations of this queue can be inferred, and the content of the last location of any given loop can be inferred as well.

An example of a corresponding syntax table is listed below in Tables 9-11:

TABLE 9

```
nnr_header( ) {
    ......
    enable_zdep_reorder
    ......
}
``` enable_zdep_reorder being 0 indicates that reorder of zdep_array is not allowed, and enable_zdep_reorder being 1 indicates that reorder of the zdep_array is allowed.

TABLE 10

```
ctu3d_header( ) {
    ......
    zdep_array( )
    ......
}
```

TABLE 11

```
zdep_array( ) {
    ......
    reorder_flag=false
    if(enable_zdep_reorder && zdep_size>2)
        reorder_flag
    if(!reorder_flag){
        for(n=0;n<zdep_size;++n)
            zdep_array[n]=n;
        return;
    }
    queue[0]=-1;
    for(n=1;n<zdep_size-1;++n){
        signalled_flag
        queue[n]=(signalled_flag)?1:(queue[n-1]>0)?-2:-1;
    }
    queue[zdep_size-1]=(queue[zdep_size-2]>0)?-2:-1;
    for(n=0;n<zdep_size;++n){
        zdep_array[n]=-1;
        if(queue[n]==1){
            qval_minus_one
            queue[n]=qval_minus_one+1;
        }
    }
    qidx=0, zidx=-1;
    do{
        while(zdep_array[++zidx]!=-1);
        if(queue[qidx]==-1){
            zdep_array[zidx]=zidx;
        }else{
            first_zidx=zidx;
            while(queue[qidx]!=-2){
                zdep_array[zidx]=queue[qidx];
                zidx=queue[qidx];
                ++qidx;
            }
            zdep_array[zidx]= first_zidx;
            zidx= first_zidx;
        }
        ++qidx;
    }while(qidx<zdep_size);
    ......
}
``` reorder_flag being 0 indicates that zdep_array is not reordered, and reorder_flag being 1 indicates that the zdep_array is reordered.
signalled_flag being 0 indicates that content of location n of a queue is inferred, and signalled_flag being 1 indicates that the content of the location n of the queue is signaled.
qval_minus_one indicates that the content of the location n of the queue = qval_minus_one + 1.

In further embodiments, a 3D-Octree structure, a 3D-Tagtree structure, a 3D-Unitree structure and corresponding encoding methods may be used to encode a CU3D.

3D-Octree Coding

Figure 6:
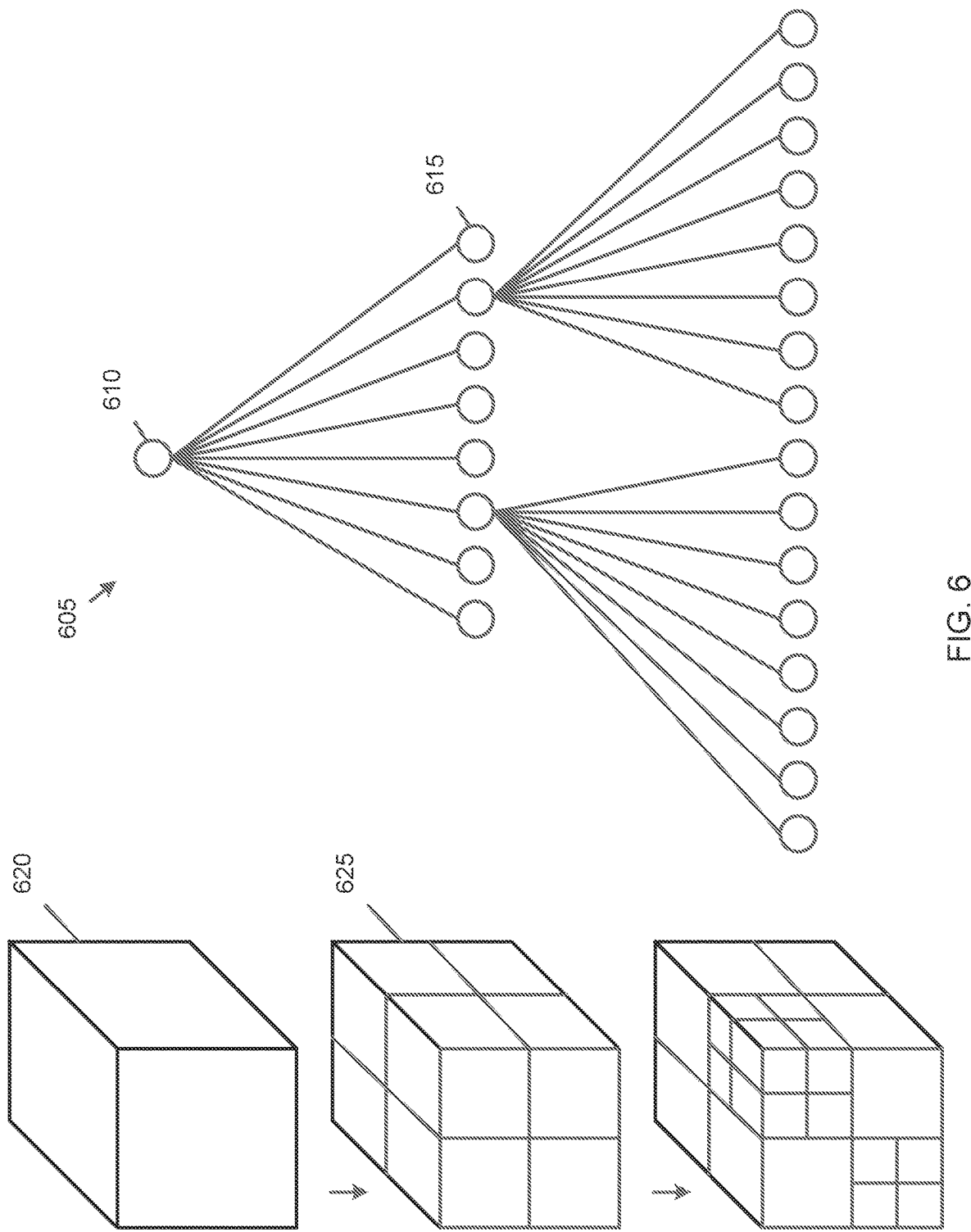
FIG. 6 is a diagram of an example of a 3D-Octree structure with three depths, according to embodiments.

As shown in FIG. 6, an Octree 605 is a tree data structure in which each internal node 610 has exactly eight child nodes 615. A 3D-Octree is used to partition a three-dimensional tensor 620 by recursively subdividing it along z, y, x axes into eight octants 625.

In embodiments, a 3D-Octree structure may be used to represent significant (non-zero) states of coefficients in a CU3D.

A 3D-Octree for a CU3D is constructed as follows. A node value of 1 for a 3D-Octree location at a last depth indicates that a codebook index (if a codebook method is used) or a coefficient (if a direct quantization coding method is used) in a corresponding CU3D is other than zero. A node value of 0 for a 3D-Octree location at a bottom depth indicates that a codebook index or a coefficient in a corresponding CU3D is zero. A node value for a 3D-Octree location at another depth is defined as a maximum or minimum value of its eight child nodes.

After the 3D-Octree is constructed, all nodes are scanned using a predefined scan order to encode respective node values.

In one embodiment, starting from a top node, a depth-first-search is used to scan all child nodes. A scan order for child nodes that share the same parent node can be defined arbitrarily, such as (0,0,0)->(0,0,1)->(0,1,0)->(0,1,1)->(1,0,0)->(1,0,1)->(1,1,0)->(1,1,1).

In another embodiment, starting from a top node, a breadth-first-search is used to scan all child nodes. A scan order for child nodes that share the same parent node can be defined arbitrarily, such as (0,0,0)->(0,0,1)->(0,1,0)->(0,1,1)->(1,0,0)->(1,0,1)->(1,1,0)->(1,1,1).

Several node skipping methods are introduced to obtain a compact representation of a bitstream.

If a node value for a 3D-Octree location at another depth is defined as a maximum value of its eight child nodes, and if a value of a parent node is 0, scanning and encoding of its child nodes (and their child nodes) is skipped as their values should always be 0. If the value of the parent node is 1 and the values of all but last child nodes are all 0s, a last child node is still scanned, but the encoding of its value is skipped as it should always be 1.

If a node value for a 3D-Octree location at another depth is defined as a minimum value of its eight child nodes, and if a value of a parent node is 1, scanning and encoding of its child nodes (and their child nodes) is skipped as their values should always be 1. If the value of the parent node is 0 and the values of all but last child nodes are all 1s, a last child node is still scanned, but the encoding of its value is skipped as it should always be 0.

An encoding_start_depth is defined to indicate a first depth that participates in an encoding process. When all nodes are scanned using a predefined scan order, encoding of a current node value is skipped if a depth of this node is above encoding_start_depth.

If a value of a node at a bottom depth is 1, its corresponding non-zero codebook index is encoded if a codebook coding method is used. If a direct quantization coding method is used, a sign bit of its corresponding non-zero coefficient is encoded, followed by an absolute value of the nonzero coefficient.

For some CU3Ds with different depths/heights/widths, there are not enough coefficients to construct a complete 3D-Octree in which all parent nodes have all eight child nodes available. Scanning and encoding of these non-exist child nodes are skipped if a parent node does not have all eight child nodes.

An example of a corresponding syntax table is listed below in Table 12:

TABLE 12

```
octree3d(start_depth,depth,z_idx,y_idx,x_idx,skip){
    ......
    proceed=nzflag=bmp[depth][z_idx][y_idx][x_idx]=1
    if(depth>=start_depth){
        if(!skip){
            nzflag
            bmp[depth][z_idx][y_idx][x_idx]=nzflag
        }
        proceed=nzflag
    }
    if(proceed){
        if(depth<total_depth-1){
            skip=false
            next_z_idx=(z_idx<<1)
            next_y_idx=(y_idx<<1)
            next_x_idx=(x_idx<<1)
            if(location [next_z_idx][ next_y_idx][ next_x_idx] exist in next depth){
                octree3d(start_depth,depth+1,next_z_idx,next_y_idx,next_x_idx,skip)
            }
            if(location [next_z_idx][ next_y_idx][ next_x_idx+1] exist in next depth){
                if(depth>=start_depth)
                    skip=this is the last child node and bit value of all other child nodes are zero
                octree3d(start_depth,depth+1,next_z_idx,next_y_idx,next_x_idx+1,skip)
            }
            if(location [next_z_idx][ next_y_idx+1][ next_x_idx] exist in next depth){
                if(depth>=start_depth)
                    skip=this is the last child node and bit value of all other child nodes are zero
                octree3d(start_depth,depth+1,next_z_idx,next_y_idx+1,next_x_idx,skip)
            }
            if(location [next_z_idx][ next_y_idx+1][ next_x_idx+1] exist in next depth){
                if(depth>=start_depth)
                    skip=this is the last child node and bit value of all other child nodes are zero
                octree3d(start_depth,depth+1,next_z_idx,next_y_idx+1,next_x_idx+1,skip)
            }
```

TABLE 12-continued

```
       if(location [next_z_idx+1][ next_y_idx][ next_x_idx] exist in next
depth){
               if(depth>=start_depth)
                       skip=this is the last child node and bit value of all
other child nodes are zero
       octree3d(start_depth,depth+1,next_z_idx+1,next_y_idx,next_x_idx,skip)
       }
       if(location [next_z_idx+1][ next_y_idx][ next_x_idx+1] exist in next
depth){
               if(depth>=start depth)
                       skip=this is the last child node and bit value of all
other child nodes are zero
       octree3d(start_depth,depth+1,next_z_idx+1,next_y_idx,next_x_idx+1,skip)
       }
       if(location [next_z_idx+1][ next_y_idx+1][ next_x_idx] exist in next
depth){
               if(depth>=start_depth)
                       skip=this is the last child node and bit value of all
other child nodes are zero
       octree3d(start_depth,depth+1,next_z_idx+1,next_y_idx+1,next_x_idx,skip)
       }
       if(location [next_z_idx+1][ next_y_idx+1][ next_x_idx+1] exist in
next depth){
               if(depth>=start_depth)
                       skip=this is the last child node and bit value of all
other child nodes are zero
       octree3d(start_depth,depth+1,next_z_idx+1,next_y_idx+1,next_x_idx+1,skip)
       }
       return
    }
    if(codebook_size){
       index
       map[z_idx][y_idx][x_idx]=index
    }else{
       sign
       abs_q
       map[z_idx][y_idx][x_idx]=(sign?-int(abs_q):abs_q)
    }
  }
  ......
}
``` nzflag non-zero flag of the index
index index value
sign sign bit of the quantized coefficient
abs_q absolute value of the quantized coefficient 3D-Tagtree Coding In embodiments, a 3D-Tagtree structure may be used to represent absolute values of coefficients in a CU3D.

A 3D-Tagtree for a CU3D is constructed as follows. A node value for a 3D-Tagtree location at a last depth indicates an absolute value of a codebook index (if a codebook coding method is used) or an absolute coefficient (if a direct quantization coding method is used) in a corresponding CU3D is other than zero. A node value for a 3D-Tagtree location at another depth is defined as a maximum or minimum value of its eight child nodes.

After the 3D-Tagtree is constructed, all nodes are scanned using a predefined scan order to encode respective node values.

In one embodiment, starting from a top node, a depth-first-search is used to scan all child nodes. A scan order for child nodes that share the same parent node can be defined arbitrarily, such as (0,0,0)->(0,0,1)->(0,1,0)->(0,1,1)->(1,0,0)->(1,0,1)->(1,1,0)->(1,1,1).

In another embodiment, starting from a top node, a breadth-first-search is used to scan all child nodes. A scan order for child nodes that share the same parent node can be defined arbitrarily, such as (0,0,0)->(0,0,1)->(0,1,0)->(0,1,1)->(1,0,0)->(1,0,1)->(1,1,0)->(1,1,1).

A node value is encoded if a corresponding node is a top node that does not have a parent node. For any child node, a difference between a parent node and the child node is encoded. Several node skipping methods are introduced to obtain a compact representation of a bitstream.

If a node value for a 3D-Tagtree location at another depth is defined as a maximum value of its eight child nodes, and if a value of a parent node is 0, scanning and encoding of its child nodes (and their child nodes) is skipped as their values should always be 0. If the value of a parent node is X and the values of all but last child nodes are smaller than X, a last child node is still scanned, but the encoding of its value is skipped as it should always be X.

If a node value for a 3D-Tagtree location at another depth is defined as a minimum value of its eight child nodes, and if a value of a parent node is X and values of all but last child nodes are bigger than X, a last child node is still scanned, but encoding of its value is skipped as it should always be X.

An encoding_start_depth is defined to indicate a first depth that participates in an encoding process. When all nodes are scanned using a predefined scan order, encoding of a current node value is skipped if a depth of this node is above encoding_start_depth. An actual value instead of a difference between a parent node and this current node is encoded if the depth of this node equals to encoding_start_depth.

If a value of a node at a bottom depth is not zero and a direct quantization coding method is used, a sign bit of its corresponding non-zero coefficient is encoded.

For some CU3Ds with different depths/heights/widths, there are not enough coefficients to construct a complete 3D-Tagtree in which all parent node have all eight child nodes available. Scanning and encoding of these non-exist child nodes are skipped if a parent node does not have all eight child nodes.

An example of a corresponding syntax table is listed below in Table 13:

TABLE 13

```
tagtree3d(start_depth,depth,z_idx,y_idx,x_idx,skip){
    ......
    proceed=nzflag=1
    if(depth)
        rmap[depth][z_idx][y_idx][x_idx]=rmap[depth-1] [z_idx>>1][y_idx>>1][x_idx>>1]
    if(depth>=start_depth){
        if(!skip){
            if(codebook_size){
                if(depth==start_depth){
                    index=0
                    nzflag_index
                    if(nzflag_index)
                        index
                    rmap[depth][z_idx][y_idx][x_idx]=index
                }else{
                    delta_index
                    rmap[depth][z_idx][y_idx][x_idx]=
                        rmap[depth-1][z_idx>>1][y_idx>>1][x_idx>>1]-delta_index
                }
            }else{
                if(depth==start_depth){
                    abs_q=0
                    nzflag_q
                    if(nzflag_q)
                        abs_q
                    rmap[depth][z_idx][y_idx][x_idx]=abs_q
                }else{
                    delta_abs_q
                    rmap[depth][z_idx][y_idx][x_idx]=
                        rmap[depth-1][z_idx>>1][y_idx>>1][x_idx>>1]-delta_abs_q
                }
            }
            nzflag=(rmap[depth][z_idx][y_idx][x_idx]!=0)
        }
        if(depth==total_depth-1&nzflag&&codebook_size==0){
            sign_q
            rmap[depth][z_idx][y_idx][x_idx]=
                (sign?-int(rmap[depth][z_idx][y_idx][x_idx]):rmap[depth][z_idx][y_idx][x_idx])
        }
        proceed=nzflag
    }
    if(proceed){
        if(depth<total_depth-1){
            skip=false
            next_z_idx=(z_idx<<1)
            next_y_idx=(y_idx<<1)
            next_x_idx=(x_idx<<1)
            if(location [next_z_idx][ next_y_idx][ next_x_idx] exist in next depth){
                tagtree3d(start_depth,depth+1,next_z_idx,next_y_idx,next_x_idx,skip)
            }
            if(location [next_z_idx][ next_y_idx][ next_x_idx+1] exist in next depth){
                if(depth>=start_depth)
                    skip=this is the last child node and value of all other child nodes are smaller than value of parent node
                tagtree3d(start_depth,depth+1,next_z_idx,next_y_idx,next_x_idx+1,skip)
            }
            if(location [next_z_idx][ next_y_idx+1][ next_x_idx] exist in next depth){
                if(depth>=start_depth)
                    skip=this is the last child node and value of all other child nodes are smaller than value of parent node
                tagtree3d(start_depth,depth+1,next_z_idx,next_y_idx+1,next_x_idx,skip)
            }
```

TABLE 13-continued

```
            if(location [next_z_idx][ next_y_idx+1][ next_x_idx+1] exist in next
depth){
                    if(depth>=start_depth)
                            skip=this is the last child node and value of all other
child nodes are smaller than value of parent node
            tagtree3d(start_depth,depth+1,next_z_idx,next_y_idx+1,next_x_idx+1,skip)
                    }
            if(location [next_z_idx+1][ next_y_idx][ next_x_idx] exist in next
depth)
                    if(depth>=start_depth)
                            skip=this is the last child node and value of all other
child nodes are smaller than value of parent node
            tagtree3d(start_depth,depth+1,next_z_idx+1,next_y_idx,next_x_idx,skip)
            if(location [next_z_idx+1][ next_y_idx][ next_x_idx+1] exist in next
depth){
                    if(depth>=start_depth)
                            skip=this is the last child node and value of all other
child nodes are smaller than value of parent node
            tagtree3d(start_depth,depth+1,next_z_idx+1,next_y_idx,next_x_idx+1,skip)
                    }
            if(location [next_z_idx+1][ next_y_idx+1][ next_x_idx] exist in next
depth){
                    if(depth>=start_depth)
                            skip=this is the last child node and value of all other
child nodes are smaller than value of parent node
            tagtree3d(start_depth,depth+1,next_z_idx+1,next_y_idx+1,next_x_idx,skip)
                    }
            if(location [next_z_idx+1][ next_y_idx+1][ next_x_idx+1] exist in
next depth){
                    if(depth>=start_depth)
                            skip=this is the last child node and value of all other
child nodes are smaller than value of parent node
            tagtree3d(start_depth,depth+1,next_z_idx+1,next_y_idx+1,next_x_idx+1,skip)
                    }
            return
        }
        map[z_idx][y_idx][x_idx]=rmap[depth][z_idx][y_idx][x_idx]
    }
    ......
}
``` nzflag_index non-zero flag of the index
index index value
delta_index index value = parent node index value + delta_index
nzflag_q non-zefo flag of the quantized coefficient
abs_q absolute value of quantized coefficient
delta_abs_q absolute value of quantized coefficient = parent node value + delta_abs_q
sign_q sign bit of the quantized coefficient

Escape Coding

In a codebook coding method, an escape index is a special index in which a coefficient that is represented by the escape index can have different quantized coefficient values. The quantized coefficient values for all escape indices need to be encoded in a bitstream explicitly.

After 3D-Octree or 3D-Tagtree coding is completed, an escape coding procedure is launched if a codebook coding method is used. All codebook indices are scanned, and if an escape index is found, a non-zero flag of a corresponding quantized coefficient value is encoded. If the coefficient value is not zero, a sign bit followed by the absolute value of the quantized coefficient value are encoded.

An example of a corresponding syntax table is listed below in Table 14:

TABLE 14

```
escape( ){
    ......
    if(codebook_size)
        for(z=0;z<cu_cdepth;++z)
            for(y=0;y<cu_height;++y)
                for(x=0;x<cu_width;++x)
                    if(map[z][y][x]==codebook_size){
                        q=0
                        nzflag
```

TABLE 14-continued

```
                        if(nzflag){
                            sign
                            abs_q
                            q=(sign?-int(abs_q):abs_q)
                        }
                    }
    ......
}
``` nzflag non-zero flag
sign sign bit
abs_q quantized coefficient q=(sign?-int(abs_q):abs_q)

CTU3D Header

An encoding algorithm is applied to use both a 3D-Octree method and a 3D-tagteee method, and one mode with a better RD is chosen as the winner. A mode decision is recorded, and a ctu3d_map_mode_flag is defined to indicate if all CU3Ds in this CTU3D share the same map_mode. An enable_start_depth is also defined to indicate if CU3D encoding can start from a depth other than a bottom depth.

An example of a corresponding syntax table is listed below in Tables 15 and 16:

TABLE 15

```
ctu3d( ){
    ......
    ctu3d_header( )
    cu3d(0,0,0)
    ......
}
```

TABLE 16

```
ctu3d header( ){
    ......
    ctu3d_map_mode_flag
    if(!ctu3d_map_mode_flag)
        map_mode
    enable_start_depth
    ......
}
``` ctu3d_map_mode_flag being 0 indicates that each cu3d use its own map_mode, and ctu3d_map_mode_flag being 1 indicates that all cu3d share one map_mode.
map_mode being 0 indicates that a 3D-Octree coding method is selected, and map_mode being 1 indicates that a 3D-Tagtree coding method is selected.
enable_start_depth being 0 indicates cu3d encoding always start at a bottom depth, and enable_start_depth being 1 indicates that cu3d encoding can start from a depth other than the bottom depth.

Mode Decision

An encoding algorithm is applied to use both a 3D-Octree method and a 3D-tagteee method, and one mode with a better RD is chosen as the winner. A mode decision is recorded in a CU3D syntax section. An encoding_start_depth is also recorded in the CU3D syntax section.

An example of a corresponding syntax table is listed below in Table 17:

TABLE 17

```
cu3d(depth,y_idx,x_idx){
    ......
    if(ctu3d_map_mode_flag)
        map_mode
    start_depth_delta=0
    if(enable_start_depth)
        start_depth_delta
    start_depth=total_depth-1-start_depth_delta
    if(map_mode==0)
        octree3d(start_depth,0,0,0,0,false)
    elseif(map_mode==1)
        tagtree3d(start_depth,0,0,0,0,false)
    escape( )
    ......
}
``` map_mode being 0 indicates that a 3D-Octree method is selected, and map_mode being 1 indicates that a 3D-Tagtree method is selected.
start_depth_delta start_depth=total_depth-1-start_depth_delta 3D-Unitree Coding If a node value for a 3D-Octree location at another depth is defined as a maximum value of its eight child nodes, the node value that equals to zero indicates that all its child nodes (and their child nodes, including nodes at a last depth) have identical values of zero. A value of zero of a node at the last depth indicates that a corresponding codebook index or coefficient is zero as well.

In embodiments, the above requirement is relaxed so that the aforementioned identical value can be any value, not just zero.

A 3D-Unitree for a CU3D is constructed as follows. A node value of 1 for a 3D-Unitree location at a depth other than a last depth indicates that its child nodes (and their child nodes, including nodes at the last depth) have non-unified (different) values. A node value of 0 for a 3D-Unitree location at a depth other than the last depth indicates that all its child nodes (and their child nodes, including nodes at the last depth) have unified (identical) values.

For nodes at a last depth that have the same parent node, a value of 1 is assigned to these nodes, if codebook indices (if a codebook coding method is used) or an absolute value of coefficients (if a direct quantization coding method is used) in a corresponding CU3D have non-unified values. A value of 0 is assigned to these nodes, if the codebook indices (if the codebook coding method is used) or the absolute value of the coefficients (if the direct quantization coding method is used) in the corresponding CU3D have unified values of any values including zero.

After the 3D-Unitree is constructed, all nodes are scanned using a predefined scan order to encode respective node values.

In one embodiment, starting from a top node, a depth-first-search is used to scan all child nodes. A scan order for child nodes that share the same parent node can be defined arbitrarily, such as (0,0,0)->(0,0,1)->(0,1,0)->(0,1,1)->(1,0,0)->(1,0,1)->(1,1,0)->(1,1,1).

In another embodiment, starting from a top node, a breadth-first-search is used to scan all child nodes. A scan order for child nodes that share the same parent node can be defined arbitrarily, such as (0,0,0)->(0,0,1)->(0,1,0)->(0,1,1)->(1,0,0)->(1,0,1)->(1,1,0)->(1,1,1).

To have a compact representation of a bitstream, after a value of a given node is encoded, its corresponding unified value is also encoded if the node value is zero, but scanning and encoding of its child nodes (and their child nodes) is skipped as their values should always equal to a unified value.

An encoding_start_depth is defined to indicate a first depth that participates in encoding process. When all nodes are scanned using a predefined scan order, encoding of a current node value is skipped if a depth of this node is above encoding_start_depth.

If a node at a last depth is reached, if encoding_start_depth is the last depth or its parent node value is not zero, its corresponding codebook index or coefficient is encoded into a bitstream. Otherwise, if a direct quantization coding method is used and its corresponding unified value is not zero, a sign bit of the coefficient is encoded into the bitstream.

For some CU3Ds with different depths/heights/widths, there are not enough coefficients to construct a complete 3D-Octree in which all parent nodes have all eight child nodes available. Scanning and encoding of these non-exist child nodes are skipped if a parent node does not have all eight child nodes.

An example of a corresponding syntax table is listed below in Table 18:

TABLE 18

```
unitree3d(start_depth,depth,z_idx,y_idx,x_idx,skip){
    ......
    if(depth<total_depth-1){
        nzflag=utree[depth][z_idx][y_idx][x_idx]=0
        if(depth>=start_depth){
            if(!skip){
                nzflag
                utree[depth][z_idx][y_idx][x_idx]=nzflag
```

TABLE 18-continued

```
                if(!nzflag){
                    map_nzflag
                    if(map_nzflag){
                        if(codebook_size){
                            cmap_val
                            map_val=cmap_val
                        }else{
                            qmap_val
                            map_val=qmap_val
                        }
                    }
                }
            }
            next_z_idx=(z_idx<<1)
            next_y_idx=(y_idx<<1)
            next_x_idx=(x_idx<<1)
            bskip=(depth>=start_depth)?!nzflag:false;
            if(location [next_z_idx][ next_y_idx][ next_x_idx] exist in next depth)
    unitree3d(start_depth,depth+1,next_z_idx,next_y_idx,next_x_idx,bskip)
            if(location [next_z_idx][ next_y_idx][ next_x_idx+1] exist in next
depth)
    unitree3d(start_depth,depth+1,next_z_idx,next_y_idx,next_x_idx+1,bskip)
            if(location [next_z_idx][ next_y_idx+1][ next_x_idx] exist in next
depth)
    unitree3d(start_depth,depth+1,next_z_idx,next_y_idx+1,next_x_idx,bskip)
            if(location [next_z_idx][ next_y_idx+1][ next_x_idx+1] exist in next
depth)
    unitree3d(start_depth,depth+1,next_z_idx,next_y_idx+1,next_x_idx+1,bskip)
            if(location [next_z_idx+1][ next_y_idx][ next_x_idx] exist in next
depth)
    unitree3d(start_depth,depth+1,next_z_idx+1,next_y_idx,next_x_idx,bskip)
            if(location [next_z_idx+1][ next_y_idx][ next_x_idx+1] exist in next
depth)
    unitree3d(start_depth,depth+1,next_z_idx+1,next_y_idx,next_x_idx+1,bskip)
            if(location [next_z_idx+1][ next_y_idx+1][ next_x_idx] exist in next
depth)
    unitree3d(start_depth,depth+1,next_z_idx+1,next_y_idx+1,next_x_idx,bskip)
            if(location [next_z_idx+1][ next_y_idx+1][ next_x_idx+1] exist in next
depth)
    unitree3d(start_depth,depth+1,next_z_idx+1,next_y_idx+1,next_x_idx+1,bskip
)
            return
        }
        if(start_depth=total_depth-1 || utree[depth-
1][z_idx>>1][y_idx>>1][x_idx>>1]){
            map_nzflag
            if(map_nzflag){
                if(codebook_size){
                    index
                    map[z_idx][y_idx][x_idx]=index
                }else{
                    sign
                    abs_q
                    map[z_idx][y_idx][x_idx]=(sign?-int(abs_q):abs_q)
                }
            }
        }else{
            sign=0
            if(!codebook_size && map_val)
                map_sign
            map[z_idx][y_idx][x_idx]=(sign?-int(map_val):map_val)
        }
        ......
}
``` nzflag utree node value
map_nzflag non-zero flag of the unified value
cmap_val index value of the unified value
qmap_val absolute value of the unified quantized coefficient
index index value
sign sign bit of the quantized coefficient
abs_q absolute value of the quantized coefficient
map_sign sign bit of the unified quantized coefficient CTU3D Header An encoding algorithm is applied to use both a 3D-Octree method and a 3D-tagteee method, and a 3D-Unitree method is also applied when using the 3D-Octree method. One mode with a better RD is chosen as the winner. A mode decision is recorded, and a ctu3d_map_mode_flag is defined to indicate if all CU3Ds in this CTU3D share the same map_mode. An enable_start_depth is also defined to indicate if CU3D encoding can start from a depth other than a bottom depth.

Mode Decision

An encoding algorithm is applied to use both a 3D-Octree method and a 3D-tagteee method, and a 3D-Unitree method is also applied when using the 3D-Octree method. One mode with a better RD is chosen as the winner. A mode decision is recorded in a CU3D syntax section.

An example of a corresponding syntax table is listed below in Table 19:

TABLE 19

```
cu3d(depth,y_idx,x_idx){
    ......
    if(ctu3d_map_mode_flag)
        map_mode
    start_depth_delta=0
    if(enable_start_depth)
        start_depth_delta
    start_depth=total_depth-1-start_depth_delta
    if(map_mode==0){
        uni_mode
        if(uni_mode)
            unitree3d(start_depth,0,0,0,0,false)
```

TABLE 19-continued

```
        else
            octree3d(start_depth,0,0,0,0,false)
    }else if(map_mode==1)
        tagtree3d(start_depth,0,0,0,0,false)
    ......
}
``` map_mode being 0 indicates that a 3D-Octree method is selected, and map_mode being 1 indicates that a 3D-Tagtree method is selected.
start_depth_delta start_depth=total_depth-1-start_depth_delta
uni_mode being 0 indicates that a 3D-Octree method is selected, and uni_mode being 1 indicates that a 3D-Unitree method is selected.

Modification in 3D-Tree Coding Method

In an original disclosure, tree[z][y][x] is used to access location [z][y][x] at a last depth of a 3D-Tree (3D-Octree, 3D-Unitree or 3D-Tagtree), and map[z][y][x] is used to access an index map of a CU3D.

Because zdep_array[n] represents an original $n^{th}$ 2D plane before a kernel plane reorder operation, the kernel plane reorder operation requires that a z-axis is indexed by the zdep_array[n] instead of n.

In embodiments, a z-axis access for an encoding method is modified so that tree[zdep_array[z]][y][x] is used to access location [z][y][x] at a last depth of a 3D-Tree (3D-Octree, 3D-Unitree or 3D-Tagtree), and map[zdep_array[z]][y][x] is used to access an index map of a CU3D.

An example of a corresponding syntax table modification is listed below in Tables 20 and 21:

TABLE 20

Original syntax table

```
unitree3d(start_depth,depth,z_idx,y_idx,x_idx,skip){
    ......
    if(depth<total_depth-1){
        nzflag=utree[depth][z_idx][y_idx][x_idx]=0
        if(depth>=start_depth){
            if(!skip){
                nzflag
                utree[depth][z_idx][y_idx][x_idx]=nzflag
                if(!nzflag){
                    map_nzflag
                    if(map_nzflag){
                        if(codebook_size){
                            cmap_val
                            map_val=cmap_val
                        }else{
                            qmap_val
                            map_val=qmap_val
                        }
                    }
                }
            }
        }
    }
    next_z_idx=(z_idx<<1)
    next_y_idx=(y_idx<<1)
    next_x_idx=(x_idx<<1)
    bskip=(depth>=start_depth)?!nzflag:false;
    if(location [next_z_idx][ next_y_idx][ next_x_idx] exist in next depth)
        unitree3d(start_depth,depth+1,next_z_idx,next_y_idx,next_x_idx,bskip)
        if(location [next_z_idx][ next_y_idx][ next_x_idx+1] exist in next depth)
    unitree3d(start_depth,depth+1,next_z_idx,next_y_idx,next_x_idx+1,bskip)
        if(location [next_z_idx][ next_y_idx+1][ next_x_idx] exist in next depth)
    unitree3d(start depth,depth+1,next_z_idx,next_y_idx+1,next_x_idx,bskip)
        if(location [next_z_idx][ next_y_idx+1][ next_x_idx+1] exist in next depth)
    unitree3d(start_depth,depth+1,next_z_idx,next_y_idx+1,next_x_idx+1,bskip)
        if(location [next_z_idx+1][ next_y_idx][ next_x_idx] exist in next depth)
    unitree3d(start_depth,depth+1,next_z_idx+1,next_y_idx,next_x_idx,bskip)
        if(location [next_z_idx+1][ next_y_idx][ next_x_idx+1] exist in next depth)
```

TABLE 20-continued

Original syntax table

```
    unitree3d(start_depth,depth+1,next_z_idx+1,next_y_idx,next_x_idx+1,bskip)
        if(location [next_z_idx+1][ next_y_idx+1][ next_x_idx] exist in next depth)
    unitree3d(start_depth,depth+1,next_z_idx+1,next_y_idx+1,next_x_idx,bskip)
        if(location [next_z_idx+1][ next_y_idx+1][ next_x_idx+1] exist in next depth)
    unitree3d(start_depth,depth+1,next_z_idx+1,next_y_idx+1,next_x_idx+1,bskip)
        return
    }
    if(start_depth=total_depth-1 || utree[depth-1][z_idx>>1][y_idx>>1][x_idx>>1]){
        map_nzflag
        if(map_nzflag){
            if(codebook_size){
                index
                map[z_idx][y_idx][x_idx]=index
            }else{
                sign
                abs_q
                map[z_idx][y_idx][x_idx]=(sign?-int(abs_q):abs_q)
            }
        }
    }else{
        sign=0
        if(!codebook_size && map_val)
            map_sign
        map[z_idx][y_idx][x_idx]=(sign?-int(map_val):map_val)
    }
    ......
}
```

To address a 2D plane at a last depth, a variable zs_idx is defined as new z_idx.

TABLE 21

Modified syntax table

```
unitree3d(start_depth,depth,z_idx,y_idx,x_idx,skip){
    ......
    zs_idx=(depth==total_depth-1)?zdep_array[z_idx]:z_idx
    if(depth<total_depth-1){
        nzflag=utree[depth][z_idx][y_idx][x_idx]=0
        if(depth>=start_depth){
            if(!skip){
                nzflag
                utree[depth][zs_idx][y_idx][x_idx]=nzflag
                if(!nzflag){
                    map_nzflag
                    if(map_nzflag){
                        if(codebook_size){
                            cmap_val
                            map_val=cmap_val
                        }else{
                            qmap_val
                            map_val=qmap_val
                        }
                    }
                }
            }
        }
        next_z_idx=(z_idx<<1)
        next_y_idx=(y_idx<<1)
        next_x_idx=(x_idx<<1)
        bskip=(depth>=start_depth)?!nzflag:false;
        if(location [next_z_idx][ next_y_idx][ next_x_idx] exist in next depth)
    unitree3d(start_depth,depth+1,next_z_idx,next_y_idx,next_x_idx,bskip)
        if(location [next_z_idx][ next_y_idx][ next_x_idx+1] exist in next depth)
    unitree3d(start_depth,depth+1,next_z_idx,next_y_idx,next_x_idx+1,bskip)
        if(location [next_z_idx][ next_y_idx+1][ next_x_idx] exist in next depth)
```

TABLE 21-continued

Modified syntax table

```
        unitree3d(start_depth,depth+1,next_z_idx,next_y_idx+1,next_x_idx,bskip)
            if(location [next_z_idx][ next_y_idx+1][ next_x_idx+1] exist in next
depth)
        unitree3d(start_depth,depth+1,next_z_idx,next_y_idx+1,next_x_idx+1,bskip)
            if(location [next_z_idx+1][ next_y_idx][ next_x_idx] exist in next
depth)
        unitree3d(start_depth,depth+1,next_z_idx+1,next_y_idx,next_x_idx,bskip)
            if(location [next_z_idx+1][ next_y_idx][ next_x_idx+1] exist in next
depth)
        unitree3d(start_depth,depth+1,next_z_idx+1,next_y_idx,next_x_idx+1,bskip)
            if(location [next_z_idx+1][next_y_idx+1][next_x_idx] exist in next
depth)
        unitree3d(start_depth,depth+1,next_z_idx+1,next_y_idx+1,next_x_idx,bskip)
            if(location [next_z_idx+1][ next_y_idx+1][ next_x_idx+1] exist in next
depth)
        unitree3d(start_depth,depth+1,next_z_idx+1,next_y_idx+1,next_x_idx+1,bskip
)
        return
    }
    if(start_depth=total_depth-1 || utree[depth-
1][z_idx>>1][y_idx>>1][x_idx>>1]){
        map_nzflag
        if(map_nzflag){
            if(codebook_size){
                index
                map[zs_idx][y_idx][x_idx]=index
            }else{
                sign
                abs_q
                map[zs_idx][y_idx][x_idx]=(sign?-int(abs_q):abs_q)
            }
        }
    }else{
        sign=0
        if(!codebook_size && map_val)
            map_sign
        map[zs_idx][y_idx][x_idx]=(sign?-int(map_val):map_val)
    }
    ......
}
```

In further embodiments, an additional 3D-Tagtree mode, a corresponding flag and a corresponding encoding method are used to encode a CU3D.

3D-Tagtree Mode Decision

As described above, one version of a 3D-Tagtree is that a node value for a 3D-Tagtree location is defined as a maximum value of its eight child nodes (tagtree3d). Another version of a 3D-Tagtree is that a node value for a 3D-Tagtree location is defined as a minimum value of its eight child nodes (tagtree3dm). One of the two versions of a 3D-Tagteee is used to encode a CU3D.

In alternative embodiments, both versions of a 3D-Tagtree is used to encode the CU3D, and a candidate with a best RD is chosen as the winner.

In detail, an encoding algorithm may use both a 3D-Octree method and a 3D-tagteee method. A 3D-Unitree method is applied when the 3D-Octree method is used, and both versions of the 3D-Tagteee method is applied when the 3D-Tagtree method is used. A mode with a better RD is chosen as the winner, and a mode decision is recorded in a cu3d syntax section.

An example of a corresponding syntax table for a tagtree3d mode decision is listed below in Table 22:

TABLE 22

```
cu3d(depth,y_idx,x_idx){
    ......
    if(ctu3d_map_mode_flag)
        map_mode
```

TABLE 22-continued

```
    start_depth_delta=0
    if(enable_start_depth)
        start_depth_delta
    start_depth=total_depth-1-start_depth_delta
    if(map_mode==0){
        uni_mode
        if(uni_mode)
            unitree3d(start_depth,0,0,0,0,false)
        else
            octree3d(start_depth,0,0,0,0,false)
    }else if(map_mode==1){
        tgt_mode
        if(tgt_mode)
            tagtree3dm(start_depth,0,0,0,0,false)
        else
            tagtree3d(start_depth,0,0,0,0,false)
    }
    ......
}
``` map_mode being 0 indicates that an Octree method is selected, and map-mode being 1 indicates that a Tagtree3d method is selected.
start_depth_delta start_depth=total_depth-1-start_depth_delta
uni_mode being 0 indicates that the Octree method is selected, and uni_mode being 1 indicates that an Unitree3d method is selected.
tgt_mode being 0 indicates that a Tagtree3d method version 1 is selected, and tgt_mode being 1 indicates that a Tagtree3d method version 2 is selected.

An example of a corresponding syntax table for a tagtree3d coding method 1 is listed below in Table 23:

TABLE 23

```
tagtree3d(start_depth,depth,z_idx,y_idx,x_idx,skip){
    ......
    proceed=nzflag=1
    if(depth)
        rmap[depth][z_idx][y_idx][x_idx]=rmap[depth-1] [z_idx>>1]
[y_idx>>1][x_idx>>1]
    if(depth>=start_depth){
        if(!skip){
            if(codebook_size){
                if(depth==start_depth){
                    index=0
                    nzflag_index
                    if(nzflag_index)
                        index
                    rmap[depth][z_idx][y_idx][x_idx]=index
                }else{
                    delta_index
                    rmap[depth][z_idx][y_idx][x_idx]=
                        rmap[depth-
1][z_idx>>1][y_idx>>1][x_idx>>1]-delta_index
                }
            }else{
                if(depth==start_depth){
                    abs_q=0
                    nzflag_q
                    if(nzflag_q)
                        abs_q
                    rmap[depth][z_idx][y_idx][x_idx]=abs_q
                }else{
                    delta_abs_q
                    rmap[depth][z_idx][y_idx][x_idx]=
                        rmap[depth-
1][z_idx>>1][y_idx>>1][x_idx>>1]-delta_abs_q
                }
            }
            nzflag=(rmap[depth][z_idx][y_idx][x_idx]!=0)
        }
        if(depth==total_depth-1&&nzflag&&codebook_size==0){
            sign_q
            rmap[depth][z_idx][y_idx][x_idx]=
                (sign?-
int(rmap[depth][z_idx][y_idx][x_idx]):rmap[depth][z_idx][y_idx][x_idx])
        }
        proceed=nzflag
    }
    if(proceed){
        if(depth<total_depth-1){
            skip=false
            next_z_idx=(z_idx<<1)
            next_y_idx=(y_idx<<1)
            next_x_idx=(x_idx<<1)
            if(location [next_z_idx][ next_y_idx][ next_x_idx] exist in next depth){
                tagtree3d(start_depth,depth+1,next_z_idx,next_y_idx,next_x_idx,skip)
            }
            if(location [next_z_idx][ next_y_idx][ next_x_idx+1] exist in next depth){
                if(depth>=start_depth)
                    skip=this is the last child node and value of all other child nodes are smaller than value of parent node
                tagtree3d(start_depth,depth+1,next_z_idx,next_y_idx,next_x_idx+1,skip)
            }
            if(location [next_z_idx][ next_y_idx+1][ next_x_idx] exist in next depth){
                if(depth>=start_depth)
                    skip=this is the last child node and value of all other child nodes are smaller than value of parent node
                tagtree3d(start_depth,depth+1,next_z_idx,next_y_idx+1,next_x_idx,skip)
            }
            if(location [next_z_idx][ next_y_idx+1][ next_x_idx+1] exist in next depth){
                if(depth>=start_depth)
                    skip=this is the last child node and value of all other child nodes are smaller than value of parent node
                tagtree3d(start_depth,depth+1,next_z_idx,next_y_idx+1,next_x_idx+1,skip)
            }
            if(location [next_z_idx+1][ next_y_idx][ next_x_idx] exist in next depth)
```

TABLE 23-continued

```
            if(depth>=start_depth)
                skip=this is the last child node and value of all other
child nodes are smaller than value of parent node
        tagtree3d(start_depth,depth+1,next_z_idx+1,next_y_idx,next_x_idx,skip)
            if(location [next_z_idx+1][ next_y_idx][ next_x_idx+1] exist in next
depth){
            if(depth>=start_depth)
                skip=this is the last child node and value of all other
child nodes are smaller than value of parent node
        tagtree3d(start_depth,depth+1,next_z_idx+1,next_y_idx,next_x_idx+1,skip)
            }
            if(location [next_z_idx+1][ next_y_idx+1][ next_x_idx] exist in next
depth){
            if(depth>=start_depth)
                skip=this is the last child node and value of all other
child nodes are smaller than value of parent node
        tagtree3d(start_depth,depth+1,next_z_idx+1,next_y_idx+1,next_x_idx,skip)
            }
            if(location [next_z_idx+1][ next_y_idx+1][ next_x_idx+1] exist in
next depth){
            if(depth>=start_depth)
                skip=this is the last child node and value of all other
child nodes are smaller than value of parent node
        tagtree3d(start_depth,depth+1,next_z_idx+1,next_y_idx+1,next_x_idx+1,skip)
            }
            return
        }
        map[z_idx][y_idx][x_idx]=rmap[depth][z_idx][y_idx][x_idx]
    }
    ......
}
``` nzflag_index non-zefo flag of the index
index index value
delta_index index value = parent node index value − delta_index
nzflag_q non-zefo flag of the quantized coefficient
abs_q absolute value of quantized coefficient
delta_abs_q absolute value of quantized coefficient = parent node value − delta_abs_q
sign_q sign bit of the quantized coefficient

40

An example of a corresponding syntax table for a tagtree3d coding method 2 is listed below in Table 24:

TABLE 24

```
tagtree3dm(start_depth,depth,z_idx,y_idx,x_idx,skip){
    ......
    if(depth)
        rmap[depth][z_idx][y_idx][x_idx]=rmap[depth−1] [z_idx>>1]
[y_idx>>1][x_idx>>1]
    if(depth>=start_depth){
        if(!skip){
            if(codebook_size){
                if(depth==start_depth){
                    index=0
                    nzflag_index
                    if(nzflag_index)
                        index
                    rmap[depth][z_idx][y_idx][x_idx]=index
                }else{
                    delta_index
                    rmap[depth][z_idx][y_idx][x_idx]=
                        rmap[depth−
1][z_idx>>1][y_idx>>1][x_idx>>1]+delta_index
                }
            }else{
                if(depth==start_depth){
                    abs_q=0
                    nzflag_q
```

TABLE 24-continued

```
                if(nzflag_q)
                    abs_q
                    rmap[depth][z_idx][y_idx][x_idx]=abs_q
                }else{
                    delta_abs_q
                    rmap[depth][z_idx][y_idx][x_idx]=
                        rmap[depth-
1][z_idx>>1][y_idx>>1][x_idx>>1]+delta_abs_q
                }
            }
        }
        nzflag=(rmap[depth][z_idx][y_idx][x_idx]!=0)
        if(depth==total_depth-1&nzflag&&codebook_size==0){
            sign_q
            rmap[depth][z_idx][y_idx][x_idx]=
                (sign?-
int(rmap[depth][z_idx][y_idx][x_idx]):rmap[depth][z_idx][y_idx][x_idx])
        }
    }
    if(depth<total_depth-1){
        next_z_idx=(z_idx<<1)
        next_y_idx=(y_idx<<1)
        next_x_idx=(x_idx<<1)
        if(location [next_z_idx][ next_y_idx][ next_x_idx] exist in next depth){
            tagtree3dm(start_depth,depth+1,next_z_idx,next_y_idx,next_x_idx,skip)
        }
        if(location [next_z_idx][ next_y_idx][ next_x_idx+1] exist in next depth){
            if(depth>=start_depth)
                skip=this is the last child node and value of all other child
nodes are bigger than         value of parent node
            tagtree3dm(start_depth,depth+1,next_z_idx,next_y_idx,next_x_idx+1,skip)
        }
        if(location [next_z_idx][ next_y_idx+1][ next_x_idx] exist in next depth){
            if(depth>=start_depth)
                skip=this is the last child node and value of all other child
nodes are bigger than         value of parent node
            tagtree3dm(start_depth,depth+1,next_z_idx,next_y_idx+1,next_x_idx,skip)
        }
        if(location [next_z_idx][ next_y_idx+1][ next_x_idx+1] exist in next depth){
            if(depth>=start_depth)
                skip=this is the last child node and value of all other child
nodes are bigger than         value of parent node
            tagtree3dm(start_depth,depth+1,next_z_idx,next_y_idx+1,next_x_idx+1,skip)
        }
        if(location [next_z_idx+1][ next_y_idx][ next_x_idx] exist in next depth){
            if(depth>=start_depth)
                skip=this is the last child node and value of all other child
nodes are bigger than         value of parent node
            tagtree3dm(start_depth,depth+1,next_z_idx+1,next_y_idx,next_x_idx,skip)
        }
        if(location [next_z_idx+1][ next_y_idx][ next_x_idx+1] exist in next depth){
            if(depth>=start_depth)
                skip=this is the last child node and value of all other child
nodes are bigger than         value of parent node
            tagtree3dm(start_depth,depth+1,next_z_idx+1,next_y_idx,next_x_idx+1,skip)
        }
        if(location [next_z_idx+1][ next_y_idx+1][ next_x_idx] exist in next depth){
            if(depth>=start_depth)
                skip=this is the last child node and value of all other child
nodes are bigger than         value of parent node
            tagtree3dm(start_depth,depth+1,next_z_idx+1,next_y_idx+1,next_x_idx,skip)
        }
        if(location [next_z_idx+1][ next_y_idx+1][ next_x_idx+1] exist in next depth){
            if(depth>=start_depth)
                skip=this is the last child node and value of all other child
nodes are bigger than         value of parent node
            tagtree3dm(start_depth,depth+1,next_z_idx+1,next_y_idx+1,next_x_idx+1,skip)
        }
        return
    }
    ......
}
``` nzflag_index non-zefo flag of the index
index index value
delta_index index value = parent node index value + delta_index
nzflag_q non-zefo flag of the quantized coefficient
abs_q absolute value of quantized coefficient
delta_abs_q absolute value of quantized coefficient = parent node value + delta_abs_q
sign_q sign bit of the quantized coefficient In further embodiments, an additional 3D-Tagtree mode, a corresponding flag and a corresponding encoding method are used to encode a CU3D.

Combined 3D Unitree and Tagtree Coding

Unified coefficients and non-unified coefficients can co-exist in one CU3D, so a combination of a 3D-Unitree coding method and a 3D-Tagtree coding method can be used to encode such a CU3D.

Both a 3D-Tagtree and a 3D-Unitree are constructed using 3D-Tagtree and 3D-Unitree construction methods. After the 3D-Tagtree and 3D-Unitree are constructed, all nodes are scanned using a predefined scan order to encode respective node values.

In one embodiment, starting from a top node, a depth-first-search is used to scan all child nodes. A scan order for the child nodes that share the same parent node can be defined arbitrarily, such as (0,0,0)->(0,0,1)->(0,1,0)->(0,1,1)->(1,0,0)->(1,0,1)->(1,1,0)->(1,1,1).

In another embodiment, starting from a top node, a breadth-first-search is used to scan all child nodes. A scan order for child nodes that share the same parent node can be defined arbitrarily, such as (0,0,0)->(0,0,1)->(0,1,0)->(0,1,1)->(1,0,0)->(1,0,1)->(1,1,0)->(1,1,1).

To have a compact representation of a bitstream, a value of a given node from a 3D-Unitree is encoded first. If the 3D-Unitree node value is zero, its corresponding unified value is encoded, and scanning and encoding of its child nodes (and their child nodes) are skipped as their values should always be equal to a unified value. If the 3D-Unitree node value is not zero, a 3D-Tagtree coding method is used to encode either a 3D-Tagtree value if a node is a top node that does not have a parent node or a difference of 3D-Tagtree values between a parent node and this child node. Node skipping methods introduced in the above Tagtree coding section are adopted as well.

An encoding_start_depth is defined to indicate a first depth that participate in an encoding process. When all nodes are scanned using a predefined scan order, encoding of a current node value is skipped if a depth of this node is above encoding_start_depth.

If a node at a last depth is reached, and if a value of a node at a bottom depth is not zero and a direct quantization coding method is used, a sign bit of its corresponding non-zero coefficient is encoded.

For some CU3Ds with different depths/heights/widths, there are not enough coefficients to construct a complete 3D-Octree in which all parent node have all eight child nodes available. Scanning and encoding of these non-exist child nodes are skipped if a parent node does not have all eight child nodes.

Combined 2D Unitree and Tagtree Coding

In embodiments, the aforementioned combined 3D Unitree and Tagtree coding is used to encode a CU3D. In further embodiments, instead of using a 3D-Octree structure, a sequence of 2D planes is encoded independently, and for each independent 2D plane, a Quadtree structure is used to construct a 2D-Unitree and a 2D-Tagtree.

An Octree structure is used to represent a 3D-Tagtree and a 3D-Unitree. In these embodiments, a Quadtree structure is used to represent a 2D-Tagtree and a 2D-Unitree. The 2D-Tagtree and 2D-Unitree are constructed using the same principle as a 3D-Tagtree and a 3D-Unitree.

After the 2D-Tagtree and 2D-Unitree are constructed, all nodes are scanned using a predefined scan order to encode respective node values.

In one embodiment, starting from a top node, a depth-first-search is used to walk through all child nodes. A scan order for the child nodes that share the same parent node can be defined arbitrarily, such as (0,0)->(0,1)->(1,0)->(1,1).

In another embodiment, starting from a top node, a breadth-first-search is used to scan all child nodes. A scan order for child nodes that share the same parent node can be defined arbitrarily, such as (0,0)->(0,1)->(1,0)->(1,1).

To have a compact representation of a bitstream, a value of a given node from Unitree first is encoded first. If the Unitree node value is zero, its corresponding unified value is encoded, and scanning and encoding of its child nodes (and their child nodes) are skipped as their value should always equal to a unified value. If the Unitree node value is not zero, a Tagtree coding method is used to encode either a Tagtree value if a node is top node that does not have a parent node or a difference of Tagtree values between a parent node and this child node. Node skipping methods introduced in the above Tagtree coding section are adopted as well.

An encoding_start_depth is defined to indicate a first depth that participate in encoding process. When all nodes are scanned using a predefined scan order, encoding of a current node value is skipped if a depth of this node is above encoding_start_depth.

If a node at a last depth is reached, and if a value of a node at a bottom depth is not zero and a direct quantization coding method is used, a sign bit of its corresponding non-zero coefficient is encoded.

After encoding of one 2D plane is completed, a next 2D plane starts to be encoded. The process is repeated until a last 2D plane is encoded.

For some CU3Ds with different heights/widths, there are not enough coefficients to construct a complete 2D-Quadtree in which all parent node have all four child nodes available. Scanning and encoding of these non-exist child nodes are skipped if a parent node does not have all four child nodes.

Mode Decision

Along with other coding methods, a combined Unitree and Tagtree coding method may be used to encode a CU3D, and a candidate with the best RD among all of the coding methods is chosen as the winner.

In detail, an encoding algorithm uses both a 3D-Octree method and a 3D-Tagtree method. A 3D-Unitree method is applied when the 3D-Octree method is used, and a Combined-Unitree-Tagtree method is applied when the 3D-Tagtree method is used. A mode with a better RD among the 3D-Octree method and the 3D-Tagtree method is chosen as the winner, and a mode decision is recorded in a cu3d syntax section.

An example of a corresponding syntax table for a tagtree3d mode decision is listed below in Table 25:

TABLE 25 cu3d(depth,y_idx,x_idx){
......
if(ctu3d_map_mode_flag)
map_mode
start_depth_delta=0

TABLE 25-continued

```
if(enable_start_depth)
    start_depth_delta
start_depth=total_depth-1-start_depth_delta
cbook_esc_mode=0
if(enable_escape_reorder)
    cbook_esc_mode
if(map_mode==0){
    uni_mode
    if(uni_mode)
        unitree3d(start_depth,0,0,0,0,false)
    else
        octree3d(start_depth,0,0,0,0,false)
}else if(map_mode==1){
    tgt_mode
    if(tgt_mode)
        tagtree3d(start_depth,0,0,0,0,false)
```

TABLE 25-continued

```
    else
        for(z=0;z<zdep_size;++z)
            uni_tagtree3d(start_depth,0,z,0,0,false,false)
    }
    ......
}
``` map_mode being 0 indicates that an Octree method is selected, and map_mode being 1 indicates that a Tagtree3d method is selected.
start_depth_delta start_depth=total_depth-1-start_depth_delta
cbook_esc_mode being 0 indicates that an escape is not reordered, and cbook_esc_mode being 1 indicates that the escape is reordered.
uni_mode being 0 indicates that the Octree method is selected, and uni_mode being 1 indicates that a Unitree3d method is selected.
tgt_mode being 0 indicates that a uni_tgtree3d method is selected, and tgt_mode being 1 indicates that the Tagtree3d method is selected.

An example of a corresponding syntax table for a uni tagtree3d coding method is listed below in Table 26:

TABLE 26

```
uni_tagtree3d(start_depth,depth,z_idx,y_idx,x_idx,uni_skip,tgt_skip){
    ......
    zs_idx=(depth==total_depth-1)?zdep_array[z_idx]:z_idx
    uniflag=tgt[depth][zs_idx][y_idx][x_idx][0]=0
    if(depth)
        tgt[depth][zs_idx][y_idx][x_idx][1]=tgt[depth-
1][z_idx>>1][y_idx>>1][x_idx>>1][1]
    if(depth>=start_depth){
        if(!uni_skip){
            if(start_depth<total_depth-1 || ((y_idx&1)==0 && (x_idx&1)==0)){
                nzflag_uni
            }else{
                nzflag_uni=tgt[depth][zs_idx][y_idx&(~1)][x_idx&(~1)][0]
                tgt[depth][zs_idx][y_idx][x_idx][1]=abs(tgt[depth][zs_idx][y_idx&(~1)][x_idx&(~1)][
1])
            }
            uniflag=tgt[depth][zs_idx][y_idx][x_idx]=nzflag_uni
            if(!tgt_skip &&
                (start_depth<total_depth-1 || (((y_idx&1)==0 &&
(x_idx&1)==0) || uniflag))) {
                if(codebook_size){
                    if(depth==start_depth){
                        index=0
                        nzflag_index
                        if(nzflag_index)
                            index
                        tgt[depth][zs_idx][y_idx][x_idx][1]=index
                    }else{
                        delta_index
                        tgt[depth][zs_idx][y_idx][x_idx][1]=
                            tgt[depth-
1][zs_idx>>1][y_idx>>1][x_idx>>1][1]+delta_index
                    }
                }else{
                    if(depth==start_depth){
                        abs_q=0
                        nzflag_q
                        if(nzflag_q)
                            abs_q
                        tgt[depth][zs_idx][y_idx][x_idx][1]=abs_q
                    }else{
                        delta_abs_q
                        tgt[depth][zs_idx][y_idx][x_idx][1]=
                            tgt[depth-
1][zs_idx>>1][y_idx>>1][x_idx>>1][1]+delta_abs_q
                    }
                }
            }
        }
        nzflag=(tgt[depth][zs_idx][y_idx][x_idx][1]!=0)
        if(depth==total_depth-1&nzflag&&codebook_size==0){
            sign_q
            tgt[depth][zs_idx][y_idx][x_idx][1]=
                (sign?-
int(tgt[depth][zs_idx][y_idx][x_idx][1]):tgt[depth][zs_idx][y_idx][x_idx][1])
        }
    }
```

TABLE 26-continued

Figure 7:
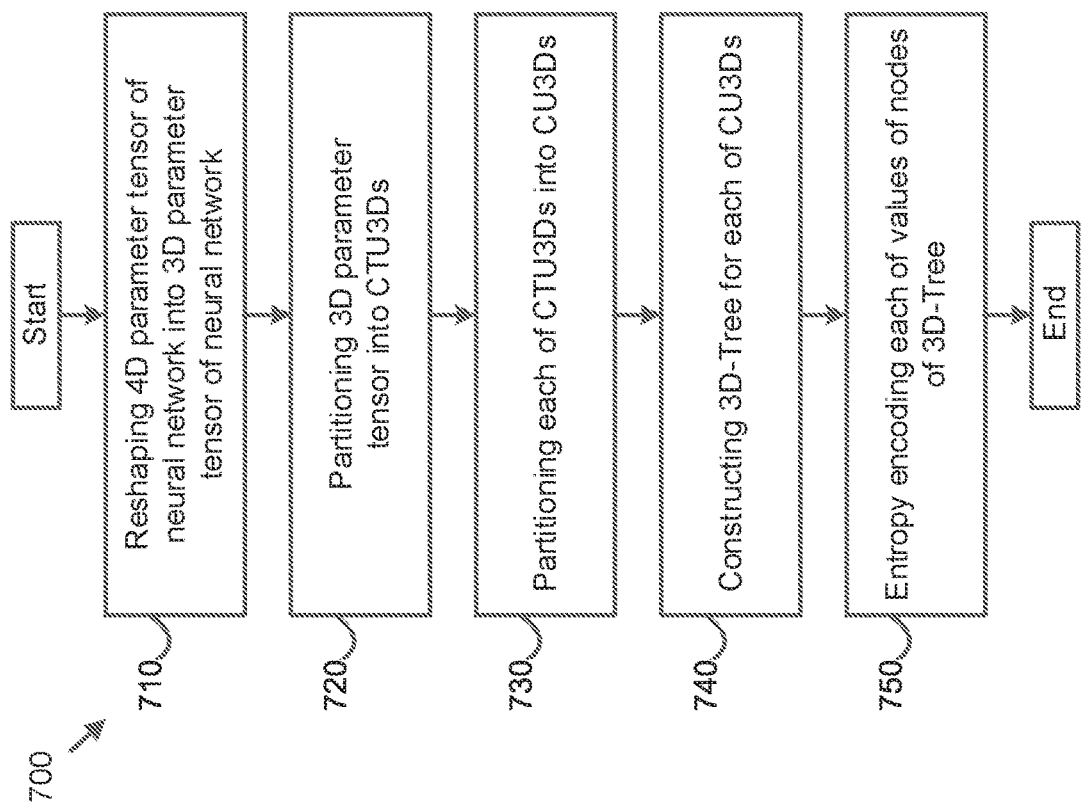
FIG. 7 is a flowchart of a method of 3D-Tree coding for neural network model compression, according to embodiments.

```
    if(depth<total_depth-1){
        next_y_idx=(y_idx<<1)
        next_x_idx=(x_idx<<1)
        uskip=(depth>=start_depth)?!uniflag:false
        if(location [z_idx][next_y_idx][next_x_idx] exist in next depth){
    uni_tagtree3d(start_depth,depth+1,z_idx,next_y_idx,next_x_idx,uskip,false)
        }
        if(location [z_idx][next_y_idx][next_x_idx+1] exist in next depth){
            if(depth>=start_depth)
                tskip=this is the last child node and value of all other child nodes
are bigger than value of parent node
    uni_tagtree3d(start_depth,depth+1,z_idx,next_y_idx,next_x_idx+1,uskip,tskip)
        }
        if(location [z_idx][next_y_idx+1][next_x_idx] exist in next depth){
            if(depth>=start_depth)
                tskip=this is the last child node and value of all other child nodes
are bigger than value of parent node
    uni_tagtree3d(start_depth,depth+1,z_idx,next_y_idx+1,next_x_idx,uskip,tskip)
        }
        if(location [z_idx][next_y_idx+1][next_x_idx+1] exist in next depth){
            if(depth>=start depth)
                tskip=this is the last child node and value of all other child nodes
are bigger than value of parent node
    uni_tagtree3d(start_depth,depth+1,z_idx,next_y_idx+1,next_x_idx+1,uskip,tskip)
        }
        return
    }
    map[zs_idx][y_idx][x_idx]=tgt[depth][zs_idx][y_idx][x_idx][1]
    ......
}
``` nzflag_uni utree node value
nzflag_index non-zero flag of index
index index value
delta_index index value = parent node index value + delta_index
nzflag_q non-zero flag of quantized coefficient
abs_q absolute value of quantized coefficient
delta_abs_q absolute value of quantized coefficient = parent node value + delta_abs_q
sign_q sign bit of quantized coefficient FIG. 7 is a flowchart of a method 700 of adaptive block partitioning for neural network model compression, according to embodiments. In some implementations, one or more process blocks of FIG. 7 may be performed by the platform 220. In some implementations, one or more process blocks of FIG. 7 may be performed by another device or a group of devices separate from or including the platform 220, such as the user device 210.

As shown in FIG. 7, in operation 710, the method 700 includes reshaping a four-dimensional (4D) parameter tensor of a neural network into 3D parameter tensor of the neural network, the 3D parameter tensor including a convolution kernel size, an input feature size and an output feature size In operation 720, the method 700 includes partitioning the 3D parameter tensor along a plane that is formed by the input feature size and the output feature size, into 3D coding tree units (CTU3Ds).

In operation 730, the method 700 includes partitioning each of the CTU3Ds into a plurality of 3D coding units (CU3Ds) recursively until a maximum depth, using a quadtree. Note that the maximum depth can be zero, which indicates that no partition of CTU3D to CU3Ds is needed.

In operation 740, the method 700 includes constructing a 3D-Tree for each of the plurality of CU3Ds.

In operation 750, the method 700 includes entropy encoding each of a plurality of values of a plurality of nodes of the 3D-Tree.

The 3D-Tree may be a 3D-Octree. Based on a codebook index or coefficient of a respective one of the plurality of CU3Ds being other than zero, a value of a node included in a last depth of the 3D-Octree may be 1. Based on the codebook index or coefficient of the respective one of the plurality of CU3Ds being zero, the value of the node included in the last depth of the 3D-Octree may be 0. A value of a parent node at another depth of the 3D-Octree may be a maximum or minimum value of child nodes of the parent node.

The 3D-Tree may be a 3D-Tagtree. Based on an absolute value of a codebook index or coefficient of a respective one of the plurality of CU3Ds being other than zero, a value of a node included in a last depth of the 3D-Tagtree may be 1. Based on the absolute value of the codebook index or coefficient of the respective one of the plurality of CU3Ds being zero, the value of the node included in the last depth of the 3D-Tagtree may be 0. A value of a parent node at another depth of the 3D-Tagtree may be a maximum value of child nodes of the parent node.

The method 700 may further include constructing another 3D-Tagtree for each of the plurality of CU3Ds. Based on the absolute value of the codebook index or coefficient of the respective one of the plurality of CU3Ds being other than zero, a value of a node included in a last depth of the other 3D-Tagtree may be 1. Based on the absolute value of the codebook index or coefficient of the respective one of the plurality of CU3Ds being zero, the value of the node included in the last depth of the other 3D-Tagtree may be 0. A value of a parent node at another depth of the other 3D-Tagtree may be a minimum value of child nodes of the parent node of the other 3D-Tagtree. The method 700 may further include entropy encoding each of a plurality of values of a plurality of nodes of the other 3D-Tagtree, and selecting the entropy-encoded plurality of values of the plurality of nodes of one of the 3D-Tagtree and the other 3D-Tagtree that has a higher rate distortion.

The 3D-Tree may be a 3D-Unitree. Based on child nodes of a parent node included in a depth other than a last depth of the 3D-Unitree having different values, a value of the parent node may be 1. Based on the child nodes of the parent node having identical values, the value of the parent node may be 0. Based on codebook indices or absolute values of coefficients of a respective one of the plurality of CU3Ds having different values, a value of a node included in the last depth may be 1. Based on the codebook indices or the absolute values of the coefficients of the respective one of the plurality of CU3Ds having identical values, the value of the node included in the last depth may be 0.

The method 700 may further include constructing a 3D-Tagtree for each of the plurality of CU3Ds. Based on an absolute value of a codebook index or coefficient of the respective one of the plurality of CU3Ds being other than zero, a value of a node included in a last depth of the 3D-Tagtree may be 1. Based on the absolute value of the codebook index or coefficient of the respective one of the plurality of CU3Ds being zero, the value of the node included in the last depth of the 3D-Tagtree may be 0. A value of a parent node at another depth of the 3D-Tagtree may be a minimum value of child nodes of the parent node of the 3D-Tagtree. The entropy encoding each of the plurality of values of the plurality of nodes of the 3D-Tree may include entropy encoding a value of a current node of the 3D-Unitree, based on the entropy-encoded value of the current node of the 3D-Unitree being zero, skipping entropy encoding of values of child nodes of the current node of the 3D-Unitree, based on the entropy-encoded value of the current node of the 3D-Unitree being other than zero and the current node of the 3D-Unitree being a top node, entropy encoding a value of a current node of the 3D-Tagtree corresponding to the current node of the 3D-Unitree, and based on the entropy-encoded value of the current node of the 3D-Unitree being other than zero and the current node of the 3D-Unitree not being the top node, entropy encoding a difference between the value of the current node of the 3D-Tagtree and a value of a parent node of the current node of the 3D-Tagtree.

The method 700 may further include reordering two-dimensional (2D) planes in at least one of the CTU3Ds and the plurality of CU3Ds, along an axis that is formed by the convolutional kernel size, to generate reorder indices respectively corresponding to orders of the 2D planes, and encoding the reorder indices in a header of the at least one of the CTU3Ds and the plurality of CU3Ds.

Although FIG. 7 shows example blocks of the method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel.

Figure 8:
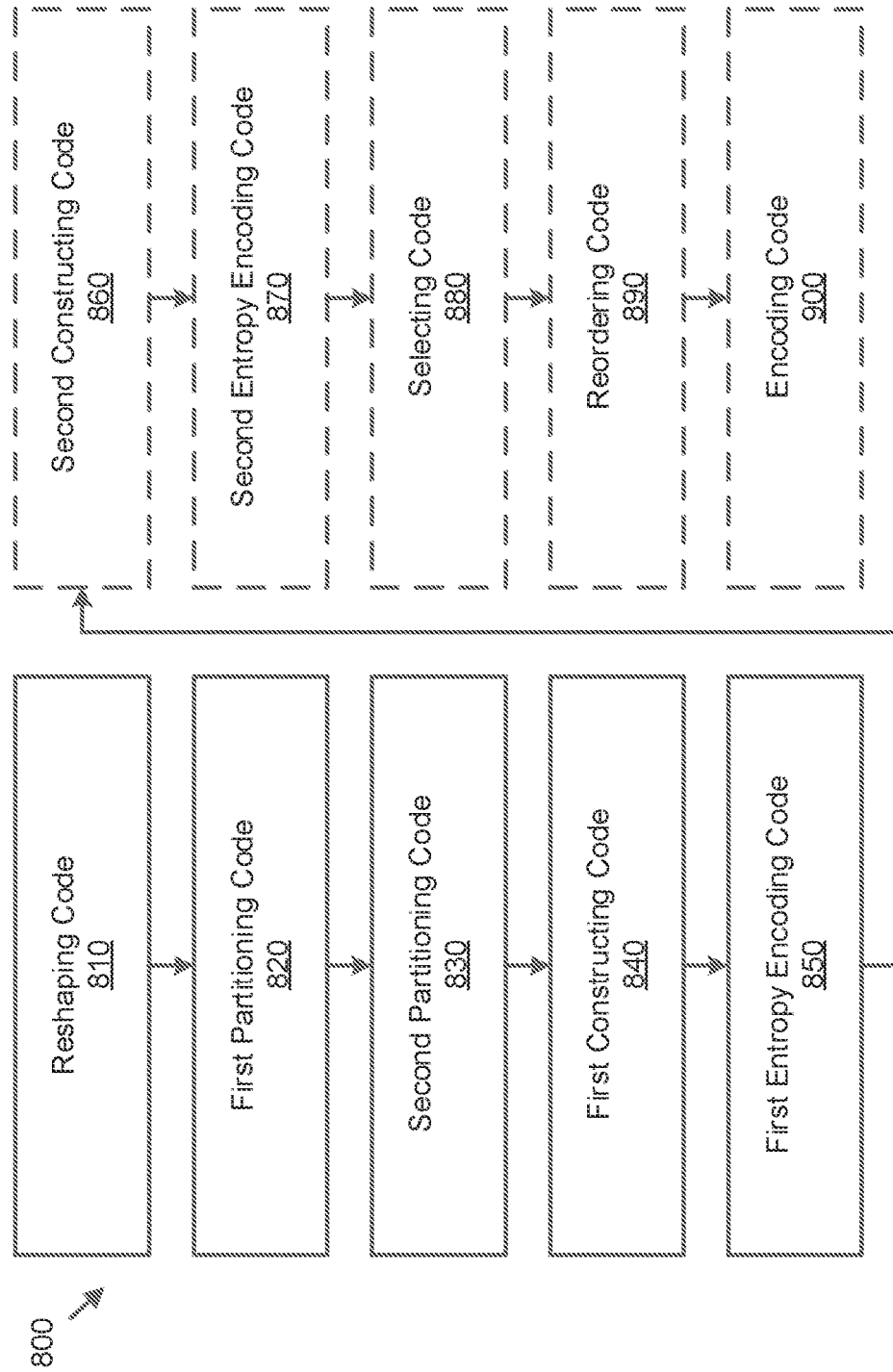
FIG. 8 is a block diagram of an apparatus for 3D-Tree coding for neural network model compression, according to embodiments.

FIG. 8 is a diagram of an apparatus 800 for adaptive block partitioning for neural network model compression, according to embodiments. As shown in FIG. 8, the apparatus 800 includes reshaping code 810, first partitioning code 820, second partitioning code 830, first constructing code 840 and first entropy encoding code 850.

The reshaping code 810 is configured to cause at least one processor of the apparatus 800 to reshape a four-dimensional (4D) parameter tensor of a neural network into 3D parameter tensor of the neural network, the 3D parameter tensor including a convolution kernel size, an input feature size and an output feature size.

The first partitioning code 820 is configured to cause the at least one processor to partition the 3D parameter tensor along a plane that is formed by the input feature size and the output feature size, into 3D coding tree units (CTU3Ds).

The second partitioning code 830 is configured to cause the at least one processor to partition each of the CTU3Ds into a plurality of 3D coding units (CU3Ds) recursively until a maximum depth, using a quad-tree.

The first constructing code 840 is configured to cause the at least one processor to construct a 3D-Tree for each of the plurality of CU3Ds.

The first entropy encoding code 850 is configured to cause the at least one processor to entropy encode each of a plurality of values of a plurality of nodes of the 3D-Tree.

The 3D-Tree may be a 3D-Octree. Based on a codebook index or coefficient of a respective one of the plurality of CU3Ds being other than zero, a value of a node included in a last depth of the 3D-Octree may be 1. Based on the codebook index or coefficient of the respective one of the plurality of CU3Ds being zero, the value of the node included in the last depth of the 3D-Octree may be 0. A value of a parent node at another depth of the 3D-Octree may be a maximum or minimum value of child nodes of the parent node.

The 3D-Tree may be a 3D-Tagtree. Based on an absolute value of a codebook index or coefficient of a respective one of the plurality of CU3Ds being other than zero, a value of a node included in a last depth of the 3D-Tagtree may be 1. Based on the absolute value of the codebook index or coefficient of the respective one of the plurality of CU3Ds being zero, the value of the node included in the last depth of the 3D-Tagtree may be 0. A value of a parent node at another depth of the 3D-Tagtree may be a maximum value of child nodes of the parent node.

The apparatus 800 may further include second constructing code 860 configured to cause the at least one processor to construct another 3D-Tagtree for each of the plurality of CU3Ds. Based on the absolute value of the codebook index or coefficient of the respective one of the plurality of CU3Ds being other than zero, a value of a node included in a last depth of the other 3D-Tagtree may be 1. Based on the absolute value of the codebook index or coefficient of the respective one of the plurality of CU3Ds being zero, the value of the node included in the last depth of the other 3D-Tagtree may be 0. A value of a parent node at another depth of the other 3D-Tagtree may be a minimum value of child nodes of the parent node of the other 3D-Tagtree. The apparatus 800 may further include second entropy encoding code 870 configured to cause the at least one processor to entropy encode each of a plurality of values of a plurality of nodes of the other 3D-Tagtree, and selecting code 880 configured to cause the at least one processor to select the entropy-encoded plurality of values of the plurality of nodes of one of the 3D-Tagtree and the other 3D-Tagtree that has a higher rate distortion.

The 3D tree may be a 3D-Unitree. Based on child nodes of a parent node included in a depth other than a last depth of the 3D-Unitree having different values, a value of the parent node may be 1. Based on the child nodes of the parent node having identical values, the value of the parent node may be 0. Based on codebook indices or absolute values of coefficients of a respective one of the plurality of CU3Ds having different values, a value of a node included in the last depth may be 1. Based on the codebook indices or the absolute values of the coefficients of the respective one of the plurality of CU3Ds having identical values, the value of the node included in the last depth may be 0.

The second constructing code 860 may be further configured to cause the at least one processor to construct a 3D-Tagtree for each of the plurality of CU3Ds. Based on an absolute value of a codebook index or coefficient of the respective one of the plurality of CU3Ds being non-zero, a value of a node included in a last depth of the 3D-Tagtree may be 1. Based on the absolute value of the codebook index or coefficient of the respective one of the plurality of CU3Ds being zero, the value of the node included in the last depth of the 3D-Tagtree may be 0. A value of a parent node at another depth of the 3D-Tagtree may be a minimum value of child nodes of the parent node of the 3D-Tagtree. The first entropy encoding 850 may be further configured to cause the at least one processor to entropy encode a value of a current node of the 3D-Unitree, based on the entropy-encoded value of the current node of the 3D-Unitree being zero, skip entropy encoding of values of child nodes of the current node of the 3D-Unitree, based on the entropy-encoded value of the current node of the 3D-Unitree being non-zero and the current node of the 3D-Unitree being a top node, entropy encode a value of a current node of the 3D-Tagtree corresponding to the current node of the 3D-Unitree, and based on the entropy-encoded value of the current node of the 3D-Unitree being non-zero and the current node of the 3D-Unitree not being the top node, entropy encode a difference between the value of the current node of the 3D-Tagtree and a value of a parent node of the current node of the 3D-Tagtree.

The apparatus 800 may further include reordering code 890 configured to cause the at least one processor to reorder two-dimensional (2D) planes in at least one of the CTU3Ds and the plurality of CU3Ds, along an axis that is formed by the convolutional kernel size, to generate reorder indices respectively corresponding to orders of the 2D planes, and encoding code 900 configured to cause the at least one processor to encode the reorder indices in a header of the at least one of the CTU3Ds and the plurality of CU3Ds.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of three-dimensional (3D)-Tree coding for neural network model compression, the method being performed by at least one processor, and the method comprising:
    reshaping a four-dimensional (4D) parameter tensor of a neural network into a 3D parameter tensor of the neural network, the 3D parameter tensor comprising a convolution kernel size, an input feature size, and an output feature size;
    partitioning the 3D parameter tensor along a plane that is formed by the input feature size and the output feature size into 3D coding tree units (CTU3Ds);
    partitioning each of the CTU3Ds into a plurality of 3D coding units (CU3Ds) recursively until a predetermined depth, using a quad-tree; and
    constructing a 3D tree for each of the plurality of CU3Ds, wherein the 3D tree for each of the plurality of CU3Ds is a 3D-Unitree,
        based on child nodes of a parent node included in a depth other than a last depth of the 3D-Unitree having different values, a value of the parent node of the 3D-Unitree is 1,
        based on the child nodes of the parent node having identical values, the value of the parent node of the 3D-Unitree is 0,
        based on codebook indices or absolute values of coefficients of a respective one of the plurality of CU3Ds having different values, a value of a node included in the last depth of the 3D-Unitree is 1, and
        based on the codebook indices or the absolute values of the coefficients of the respective one of the plurality of CU3Ds having identical values, the value of the node included in the last depth of the 3D-Unitree is 0.

2. The method of claim 1, further comprising:
    constructing a 3D-Tagtree for each of the plurality of CU3Ds,
    wherein based on the codebook indices or the absolute values of the coefficients of the respective one of the plurality of CU3Ds being other than zero, a value of a node included in a last depth of the 3D-Tagtree is 1, and
    based on the codebook indices or the absolute values of the coefficients of the respective one of the plurality of CU3Ds being zero, the value of the node included in the last depth of the 3D-Tagtree is 0.

3. The method of claim 2, further comprising entropy encoding each of a plurality of values of a plurality of nodes of the 3D tree, wherein the entropy encoding comprises:
    entropy encoding a value of a current node of the 3D-Unitree;

based on the entropy-encoded value of the current node of the 3D-Unitree being zero, skipping entropy encoding of values of child nodes of the current node of the 3D-Unitree;

based on the entropy-encoded value of the current node of the 3D-Unitree being non-zero and the current node of the 3D-Unitree being a top node, entropy encoding a value of a current node of the 3D-Tagtree corresponding to the current node of the 3D-Unitree; and based on the entropy-encoded value of the current node of the 3D-Unitree being non-zero and the current node of the 3D-Unitree not being the top node, entropy encoding a difference between the value of the current node of the 3D-Tagtree and a value of a parent node of the current node of the 3D-Tagtree.

4. The method of claim 3, wherein entropy encoding of each of the plurality of values of the plurality of nodes of the 3D tree comprises determining a start depth indicating a first depth being encoded.

5. The method of claim 4, further comprising
encoding the codebook indices or the absolute values of the coefficients of the respective one of the plurality of CU3Ds based on the first depth being the last depth of the 3D tree or the value of the parent node at the depth other than the last depth of the 3D tree being non-zero; and encoding a sign bit of a coefficient of the respective one of the plurality of CU3Ds based on a corresponding unified value of the respective parent node included at the depth other than the last depth of the 3D tree being non-zero and direct quantization coding method being used.

6. The method of claim 2, further comprising
a value of a parent node at a depth other than the last depth of the 3D-Tagtree is a minimum value of child nodes of the parent node at the depth other than the last depth of the 3D-Tagtree; and encoding a value of a last child node of the parent node at the depth other than the last depth of the 3D-Tagtree equal to the value of the parent node based on all but the last child node of the parent node at the depth other than the last depth of the 3D-Tagtree being greater than the value of the parent node.

7. The method of claim 2, further comprising
a value of a parent node at a depth other than the last depth of the 3D-Tagtree is a maximum value of child nodes of the parent node at the depth other than the last depth of the 3D-Tagtree; and encoding a value of a last child node of the parent node at the depth other than the last depth of the 3D-Tagtree equal to the value of the parent node based on all but the last child node of the parent node at the depth other than the last depth of the 3D-Tagtree being smaller than the value of the parent node.

8. The method of claim 1, further comprising:
encoding a unified value of the parent node included at the depth other than the last depth of the 3D-Unitree based on determining that the value of the parent node of the 3D-Unitree is 0; and skipping encoding of the child nodes of the parent node included at the depth other than the last depth of the 3D-Unitree.

9. An apparatus for adaptive block partitioning for neural network model compression, the apparatus comprising:
at least one memory configured to store program code; and at least one processor configured to read the program code and operate as instructed by the program code, the program code comprising:
reshaping code configured to cause the at least one processor to reshape a four-dimensional (4D) parameter tensor of a neural network into a 3D parameter tensor of the neural network, the 3D parameter tensor comprising a convolution kernel size, an input feature size, and an output feature size;

first partitioning code configured to cause the at least one processor to partition the 3D parameter tensor along a plane that is formed by the input feature size and the output feature size, into 3D coding tree units (CTU3Ds);

second partitioning code configured to cause the at least one processor to partition each of the CTU3Ds into a plurality of 3D coding units (CU3Ds) recursively until a maximum depth, using a quad-tree; and first constructing code configured to cause the at least one processor to construct a 3D tree for each of the plurality of CU3Ds, wherein the 3D tree for each of the plurality of CU3Ds is a 3D-Unitree,
based on child nodes of a parent node included in a depth other than a last depth of the 3D-Unitree having different values, a value of the parent node of the 3D-Unitree is 1, based on the child nodes of the parent node having identical values, the value of the parent node of the 3D-Unitree is 0, based on codebook indices or absolute values of coefficients of a respective one of the plurality of CU3Ds having different values, a value of a node included in the last depth of the 3D-Unitree is 1, and based on the codebook indices or the absolute values of the coefficients of the respective one of the plurality of CU3Ds having identical values, the value of the node included in the last depth of the 3D-Unitree is 0.

10. The apparatus of claim 9, further comprising:
second constructing code configured to cause the at least one processor to construct a 3D-Tagtree for each of the plurality of CU3Ds, wherein based on the codebook indices or the absolute values of the coefficients of the respective one of the plurality of CU3Ds being other than zero, a value of a node included in a last depth of the 3D-Tagtree is 1, and based on the codebook indices or the absolute values of the coefficients the respective one of the plurality of CU3Ds being zero, the value of the node included in the last depth of the 3D-Tagtree is 0.

11. The apparatus of claim 10, further comprising first encoding code configured to cause the at least one processor to entropy encode each of a plurality of values of a plurality of nodes of the 3D tree, wherein the first encoding code comprises:
entropy encoding a value of a current node of the 3D-Unitree;

based on the entropy-encoded value of the current node of the 3D-Unitree being zero, skipping entropy encoding of values of child nodes of the current node of the 3D-Unitree;

based on the entropy-encoded value of the current node of the 3D-Unitree being non-zero and the current node of the 3D-Unitree being a top node, entropy encoding a value of a current node of the 3D-Tagtree corresponding to the current node of the 3D-Unitree; and based on the entropy-encoded value of the current node of the 3D-Unitree being non-zero and the current node of the 3D-Unitree not being the top node, entropy encoding a difference between the value of the current node of the 3D-Tagtree and a value of a parent node of the current node of the 3D-Tagtree.

12. The apparatus of claim 11, further comprising first determining code configured to cause the at least one processor to determine a start depth indicating a first depth being encoded.

13. The apparatus of claim 12, further comprising:
third encoding code configured to cause the at least one processor to encode the codebook indices or the absolute values of the coefficients of the respective one of the plurality of CU3Ds based on the first depth being the last depth of the 3D tree or the value of the parent node at the depth other than the last depth of the 3D tree being non-zero; and
fourth encoding code configured to cause the at least one processor to encode a sign bit of a coefficient of the respective one of the plurality of CU3Ds based on a corresponding unified value of the respective parent node included at the depth other than the last depth of the 3D tree being non-zero and direct quantization coding method being used.

14. The apparatus of claim 10, wherein the second constructing code further comprising:
a value of a parent node at a depth other than the last depth of the 3D-Tagtree is a minimum value of child nodes of the parent node at the depth other than the last depth of the 3D-Tagtree; and
encoding a value of a last child node of the parent node at the depth other than the last depth of the 3D-Tagtree equal to the value of the parent node based on all but the last child node of the parent node at the depth other than the last depth of the 3D-Tagtree being greater than the value of the parent node.

15. The apparatus of claim 10, wherein the second constructing code further comprising:
a value of a parent node at a depth other than the last depth of the 3D-Tagtree is a maximum value of child nodes of the parent node at the depth other than the last depth of the 3D-Tagtree; and
encoding a value of a last child node of the parent node at the depth other than the last depth of the 3D-Tagtree equal to the value of the parent node based on all but the last child node of the parent node at the depth other than the last depth of the 3D-Tagtree being smaller than the value of the parent node.

16. The apparatus of claim 9, further comprising:
second encoding code configured to cause the at least one processor to encode a unified value of the parent node included at the depth other than the last depth of the 3D-Unitree based on determining that the value of the parent node of the 3D-Unitree is 0; and
first skipping code configured to cause the at least one processor to skip encoding of the child nodes of the parent node included at the depth other than the last depth of the 3D-Unitree.

17. A non-transitory computer-readable medium storing instructions that, when executed by at least one processor for adaptive block partitioning for neural network model compression, cause the at least one processor to:
reshape a four-dimensional (4D) parameter tensor of a neural network into a 3D parameter tensor of the neural network, the 3D parameter tensor comprising a convolution kernel size, an input feature size, and an output feature size;
partition the 3D parameter tensor along a plane that is formed by the input feature size and the output feature size into 3D coding tree units (CTU3Ds);
partition each of the CTU3Ds into a plurality of 3D coding units (CU3Ds) recursively until a predetermined depth, using a quad-tree; and
construct a 3D tree for each of the plurality of CU3Ds, wherein the 3D tree for each of the plurality of CU3Ds is a 3D-Unitree,
based on child nodes of a parent node included in a depth other than a last depth of the 3D-Unitree having different values, a value of the parent node of the 3D-Unitree is 1,
based on the child nodes of the parent node having identical values, the value of the parent node of the 3D-Unitree is 0,
based on codebook indices or absolute values of coefficients of a respective one of the plurality of CU3Ds having different values, a value of a node included in the last depth of the 3D-Unitree is 1, and
based on the codebook indices or the absolute values of the coefficients of the respective one of the plurality of CU3Ds having identical values, the value of the node included in the last depth of the 3D-Unitree is 0.

18. The non-transitory computer-readable medium of claim 17, wherein the instructions, when executed by the at least one processor, further cause the at least one processor to:
construct a 3D-Tagtree for each of the plurality of CU3Ds, wherein based on the codebook indices or the absolute values of coefficients of the respective one of the plurality of CU3Ds being other than zero, a value of a node included in a last depth of the 3D-Tagtree is 1, and
based on the codebook indices or the absolute values of the coefficients of the respective one of the plurality of CU3Ds being zero, the value of the node included in the last depth of the 3D-Tagtree is 0.

19. The non-transitory computer-readable medium of claim 18, wherein the instructions, when executed by the at least one processor, further cause the at least one processor to:
entropy encode a value of a current node of the 3D-Unitree;
based on the entropy-encoded value of the current node of the 3D-Unitree being zero, skipp entropy encoding of values of child nodes of the current node of the 3D-Unitree;
based on the entropy-encoded value of the current node of the 3D-Unitree being non-zero and the current node of the 3D-Unitree being a top node, entropy encode a value of a current node of the 3D-Tagtree corresponding to the current node of the 3D-Unitree; and
based on the entropy-encoded value of the current node of the 3D-Unitree being non-zero and the current node of the 3D-Unitree not being the top node, entropy encode a difference between the value of the current node of the 3D-Tagtree and a value of a parent node of the current node of the 3D-Tagtree.

20. The non-transitory computer-readable medium of claim 19, wherein the instructions, when executed by the at least one processor, further cause the at least one processor to:

determine a start depth indicating a first depth being encoded;

encode the codebook indices or the absolute values of the coefficients of the respective one of the plurality of CU3Ds based on the first depth being the last depth of the 3D tree or the value of the parent node at the depth other than the last depth of the 3D tree being non-zero; and encode a sign bit of a coefficient of the respective one of the plurality of CU3Ds based on a corresponding unified value of the respective parent node included at the depth other than the last depth of the 3D tree being non-zero and direct quantization coding method being used.

* * * * *